(12) United States Patent
Nguyen et al.

(10) Patent No.: US 6,937,659 B1
(45) Date of Patent: Aug. 30, 2005

(54) APPARATUS AND METHOD FOR COMPRESSING VIDEO INFORMATION

(75) Inventors: Truong Q. Nguyen, Burlington, MA (US); Joel Rosiene, Colchester, CT (US)

(73) Assignee: AC Capital Management, Inc., Wilmington, DE (US)

( * ) Notice: Subject to any disclaimer, the term of this patent is extended or adjusted under 35 U.S.C. 154(b) by 0 days.

(21) Appl. No.: 09/529,849

(22) PCT Filed: Nov. 13, 1998

(86) PCT No.: PCT/US98/24189

§ 371 (c)(1),
(2), (4) Date: Apr. 19, 2000

(87) PCT Pub. No.: WO99/26418

PCT Pub. Date: May 27, 1999

Related U.S. Application Data

(60) Provisional application No. 60/066,638, filed on Nov. 14, 1997.

(51) Int. Cl.[7] ................................................. H04N 7/12
(52) U.S. Cl. ................ 375/240.19; 382/248; 348/397.1
(58) Field of Search ........................ 375/240.19, 240.2, 375/240.24, 240.29, 240.08, 240.1; 348/397.1, 398.1; 382/248–250, 240, 277, 280–281

(56) References Cited

U.S. PATENT DOCUMENTS

| | | |
|---|---|---|
| 4,255,763 A | 3/1981 | Maxemchuk et al. |
| 4,394,774 A | 7/1983 | Widergren et al. |
| 4,447,886 A | 5/1984 | Meeker |
| 4,691,329 A | 9/1987 | Juri et al. |
| 4,751,742 A | 6/1988 | Meeker |
| 4,797,944 A | 1/1989 | Tanaka |
| 4,815,078 A | 3/1989 | Shimura |
| 4,825,285 A | 4/1989 | Speidel et al. |
| 4,829,378 A | 5/1989 | LeGall |
| 4,868,764 A | 9/1989 | Richards |
| 4,876,610 A | 10/1989 | Ohsawa et al. |
| 4,903,317 A | 2/1990 | Nishihara et al. |
| 5,025,482 A | 6/1991 | Murakami et al. |
| 5,051,840 A | 9/1991 | Watanabe et al. |
| 5,081,450 A | 1/1992 | Lucas et al. |

(Continued)

OTHER PUBLICATIONS

Ito et al., "On Motion Compensation Of Wavelet Coefficients", IEEE, pp. 2161–2164, 1995.*

Suhuai Luo, "On The Improvement Of Motion Compensation In Wavelet Transform Video Coding", IEEE TENCON, pp. 735–738. 1997.*

C. Podilchuck and A. Jacquin, "Subband Video Coding With Dynamic Bit Allocation and Geometric Vector Quantization," *SPIE* vol. 1666 Human Vision, Visual Processing, and Digital Display III, Feb. 1992, pp. 241–252.

(Continued)

*Primary Examiner*—Gims Philippe
(74) *Attorney, Agent, or Firm*—Pillsbury Winthrop Shaw Pittman LLP

(57) ABSTRACT

A method and apparatus is disclosed for efficiently encoding data representing a video image, thereby reducing the amount of data that must be transferred to a decoder. The method includes transforming data sets utilizing a tensor product wavelet transform which is capable of transmitting remainders from one subband to another. Collections of subbands, in macro-block form, are weighted, detected, and ranked enabling prioritization of the transformed data. A motion compensation technique is performed on the subband data producing motion vectors and prediction errors which are positionally encoded into bit stream packets for transmittal to the decoder. Subband macro-blocks and subband blocks which are equal to zero are identified as such in the bit stream packets to further reduce the amount of data that must be transferred to the decoder.

48 Claims, 15 Drawing Sheets

U.S. PATENT DOCUMENTS

| | | | |
|---|---|---|---|
| 5,086,488 A | 2/1992 | Kato et al. | |
| 5,091,782 A | 2/1992 | Krause et al. | |
| 5,101,446 A | 3/1992 | Resnikoff et al. | |
| 5,109,451 A | 4/1992 | Aono et al. | |
| 5,121,202 A | 6/1992 | Tanoi | |
| 5,148,498 A | 9/1992 | Resnikoff et al. | |
| 5,214,507 A | 5/1993 | Aravind et al. | |
| 5,216,719 A | 6/1993 | Oh | |
| 5,220,422 A | 6/1993 | Oh | |
| 5,226,093 A | 7/1993 | Iwase | |
| 5,245,678 A | 9/1993 | Eschbach et al. | |
| 5,245,679 A | 9/1993 | Rosenberg | |
| 5,265,180 A | 11/1993 | Golin | |
| 5,282,256 A | 1/1994 | Ohsawa et al. | |
| 5,295,201 A | 3/1994 | Yokohama | |
| 5,295,203 A | 3/1994 | Krause et al. | |
| 5,301,242 A | 4/1994 | Gonzales et al. | |
| 5,305,400 A | 4/1994 | Butera | |
| 5,321,776 A | 6/1994 | Shapiro | |
| 5,327,502 A | 7/1994 | Katata et al. | |
| 5,351,086 A * | 9/1994 | Park | 348/402.1 |
| 5,369,439 A | 11/1994 | Matsuda et al. | |
| 5,384,725 A | 1/1995 | Coifman et al. | |
| 5,392,255 A * | 2/1995 | LeBras et al. | 367/50 |
| 5,410,350 A | 4/1995 | Kato et al. | |
| 5,414,780 A | 5/1995 | Carnahan | |
| 5,422,964 A | 6/1995 | Devimeux et al. | |
| 5,426,512 A | 6/1995 | Watson | |
| 5,426,673 A | 6/1995 | Mitra et al. | |
| 5,428,567 A | 6/1995 | Horvath et al. | |
| 5,432,556 A | 7/1995 | Hatano et al. | |
| 5,438,635 A | 8/1995 | Richards | |
| 5,440,344 A | 8/1995 | Asamura et al. | |
| 5,442,399 A | 8/1995 | Asamura et al. | |
| 5,467,201 A | 11/1995 | Fan | |
| 5,481,553 A | 1/1996 | Suzuki et al. | |
| 5,487,119 A | 1/1996 | Kimura et al. | |
| 5,489,942 A | 2/1996 | Kawahara | |
| 5,506,916 A | 4/1996 | Nishihara et al. | |
| 5,509,089 A | 4/1996 | Ghoshal | |
| 5,517,327 A | 5/1996 | Nakatani et al. | |
| 5,517,581 A | 5/1996 | Johnston et al. | |
| 5,517,583 A | 5/1996 | Horiuchi et al. | |
| 5,526,299 A | 6/1996 | Coifman et al. | |
| 5,537,147 A | 7/1996 | Tahara | |
| 5,537,493 A | 7/1996 | Wilkinson | |
| 5,553,164 A | 9/1996 | Itagaki | |
| 5,565,920 A | 10/1996 | Lee et al. | |
| 5,570,133 A | 10/1996 | Yagasaki | |
| 5,581,481 A | 12/1996 | Weerackody et al. | |
| 5,764,814 A | 6/1998 | Chen et al. | |
| 5,777,678 A | 7/1998 | Ogata et al. | |
| 5,796,434 A * | 8/1998 | Lempel | 348/403.1 |
| 5,808,683 A | 9/1998 | Tong et al. | |
| 5,850,482 A * | 12/1998 | Meany et al. | 382/232 |
| 5,937,097 A * | 8/1999 | Lennon | 382/236 |
| 5,984,514 A * | 11/1999 | Greene et al. | 708/203 |

OTHER PUBLICATIONS

K. A. Rao and P. Yip, "Discrete Cosine Transform," Academic Press Inc., 1990, pp. 165–174.

Joel Rosiene and Ian Greenshields, "Standard Wavelet Basis Compression of Images," *Optical Engineering*, vol. 33, No. 8, Aug. 1994.

Ngan K N et al: "Very Low Bit Rate Video Coding Using 3D Subband Approach" IEEE Transactions on Circuits and Systems for Video Technology, IEEE Inc. New York, US—vol. 4, No. 3, Jun. 1, 1994, pp. 309–316, XP000450762.

Yoon S H et al: "A Scalable Wavelet Video Coder for Hybrid Communication Channels" Conference Record of the 31st Asilomar Conference on Signals, Systems & Computers. Pacific Grove, CA., Nov. 2–5, 1997, Asilomar Conference on Signals, Systems and Computers, Los Alamitos, CA.—IEEE, US. vol. 1, Nov. 2, 1997, pp. 382–386, XP000883963.

Martucci S A et al: "A Zerotree Wavelet Video Coder" IEEE Transactions on Circuits and Systems for Video Technology, IEEE Inc. New York, US—vol. 7, No. 1, Feb. 1, 1997, pp. 109–118, XP000678884.

Yang X et al: "Hierachical Backward Motion Compensation for Wavelet Video Coding Using Optimized Interpolation Filters" Proceedings of the International Conference on Image Processing, ICIP 1997. Santa Barbara, CA, Oct. 26–29, 1997, Los Almitos, CA: IEEE, US,—vol. 1, Oct. 26, 1997, pp. 85–88, XP000792722.

Song M et al: "Motion Estimation in DCT Domain" 1996 IEEE International Conference on Communications (ICC). Converging Technologies for Tomorrows Applications. Dallas, Jun. 23–27, 1996, IEEE International Conference on Communications (ICC), New York, IEEE, US, —vol. 13 1996, pp. 670–674, XP000910243.

Scotton P et al: "A Low Complexity Video Subband Coder for ATM" Signal Processing, Image Communication, Elsevier Science Publishers, Amsterdam, NL, vol. 6, No. 5, Oct. 1, 1994, pp. 421–433, XP000466025.

UHA: "Digital image compression based on non–stationary and inhomogeneous multiresolution analyses" Processings of the International Conference on Image Processing (ICIP) Austin, Nov. 13–16, 1994, Los Alamitos, IEEE Comp. Soc. Press, US, vol. 3 Conf. 1, Nov. 13, 1994, pp. 376–382, XP010146399.

Tan T K et al: "A Frequency Scalable Coding Scheme Employing Pyramid and Subband Techniques" IEEE Transactions on Circuits and Systems for Video Technology, IEEE Inc. New York, US—vol. 4, No. 2, Apr. 1, 1994, pp. 203–207, XP000 489693.

Jin Tae Kim et al: "Subband Coding Using Human Visual Characteristics for Image Signals" IEEE Journal on Selected Areas in Communications, IEEE Inc. New York, US,—vol. 11, No. 1, 1993, pp. 59–64, XP000377997.

* cited by examiner

QCIF Image 30
(Image Macro-Block Grouping)

Collection of Subbands 34

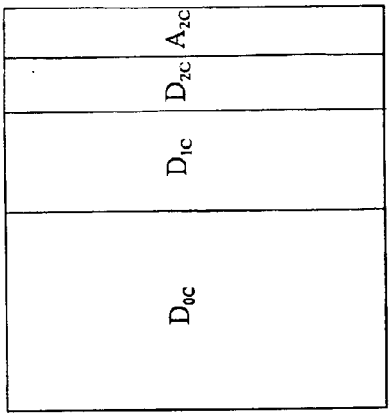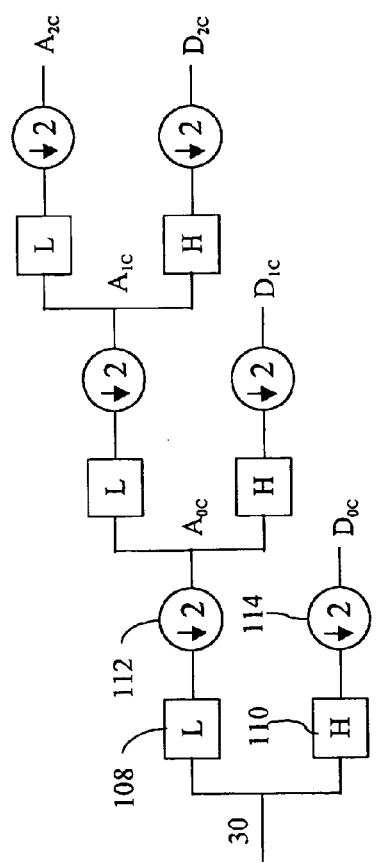
FIG. 6(a)
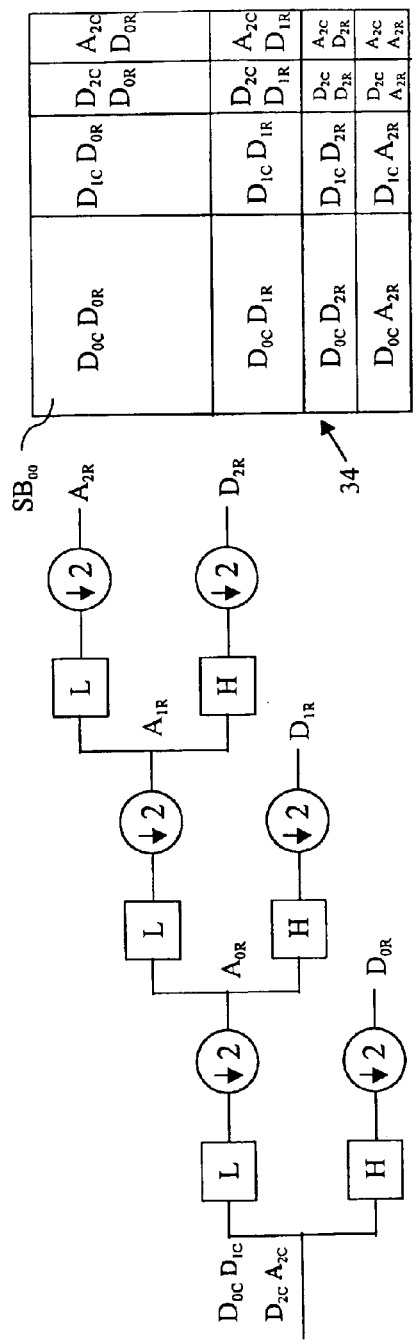
FIG. 6(b)

APPARATUS AND METHOD FOR COMPRESSING VIDEO INFORMATION

CROSS-REFERENCE TO RELATED APPLICATIONS

This application claims priority to provisional application Ser. No. 60/066,638, filed Nov. 14, 1997, which is herein incorporated by reference.

BACKGROUND OF THE INVENTION

1. Field of the Invention

The present invention relates generally to apparatus and methods for encoding and decoding video information. More particularly, the present invention relates to an apparatus and method for motion estimation and motion prediction in the transform domain.

2. Background of the Related Art

Due to the limited bandwidth available on transmission channels, only a limited number of bits are available to encode audio and video information. Video encoding techniques attempt to encode video information with as few bits as possible, while still maintaining the image quality required for a given application. Thus, video compression techniques attempt to reduce the bandwidth required to transmit a video signal by removing redundant information and representing the remaining information with a minimum number of bits, from which an approximation to the original image can be reconstructed, with a minimal loss of important features. In this manner, the compressed data can be stored or transmitted in a more efficient manner than the original image data.

There are a number of video encoding techniques which improve coding efficiency by removing statistical redundancy from video signals. Many standard image compression schemes are based on block transforms of the input image such as the Discrete Cosine Transform (DCT). The well-known MPEG video encoding technique, for example, developed by the Motion Pictures Expert Group, achieves significant bit rate reductions by taking advantage of the correlation between pixels (pels) in the spatial domain (through the use of the DCT), and the correlation between image frames in the time domain (through the use of prediction and motion compensation).

In well-known orthogonal and bi-orthogonal (subband) transform based encoding systems (inclusive of lapped orthogonal transforms), an image is transformed without the necessity of first blocking the image. Transform encoders based on DCT block the image primarily for two reasons: 1) experience has shown that the DCT is a good approximation to the known optimal transform (Kahunen-Luove') on 8×8 regions of the image or a sequence of difference images; and 2) the processing of DCT grows O(N log N) and through the blocking of the image, computational effort is limited.

The end result is that DCT based approaches, unless otherwise enhanced, have basis functions which are compactly supported by (or zero outside of) an 8×8 region of an image. The orthogonal and bi-orthogonal transforms under consideration have basis members which are predominately supported in a finite interval of the image, but share extent with neighboring spatial regions. Subband image encoding techniques, for examples, divide an input image into a plurality of spatial frequency bands, using a set of filters and then quantize each band or channel. For a detailed discussion of subband image encoding techniques see *Subband Video Coding With Dynamic Bit Allocation and Geometric Vector Quantization*, C. Podilchuck & A. Jacquin, SPIE Vol. 1666 Human Vision, Visual Processing, and Digital Display III, pp. 241–52 (February 1992). At each stage of the subband encoding process, the signal is split into a low pass approximation of the image, and a high pass term representing the detail lost by making the approximation.

In addition, DCT based transform encoders are translation invariant in the sense that the base members have a support which extends over the entire 8×8 block. This prevents motion compensation from being done efficiently in the transform domain. Therefore, most of the motion compensation techniques in use utilize temporally adjacent image frames to form an error term which is then transform coded on an 8×8 block. As a consequence, these techniques require an inverse transform to be carried out to supply a reference frame from the frequency domain to the time domain. Examples of such systems are found in U.S. Pat. No. 5,481,553 to Suzuki et al and U.S. Pat. No. 5,025,482 to Murakami et al.

FIG. 1 illustrates a simplified block diagram of a prior art standard video compression approach using DCT. In block 10, the changes in the image sequence are efficiently represented through motion detection techniques such as one technique used in MPEG when in predictive mode. In particular, a previous frame is used as a reference frame and a subsequent frame, in forward prediction, is compared against the previous frame to eliminate temporal redundancies and rank the differences between them according to degree. This step sets the stage for motion prediction of the subsequent frame and also reduces the data size of the subsequent frame. In block 12, a determination is made as to which parts of the image have moved. Continuing with the MPEG example, using the data set provided by block 10, interframe motion prediction is carried out by applying motion compensation techniques to the reference frame and subsequent frame. The resulting prediction is subtracted from the subsequent frame to generate a prediction error/frame. Thereafter, in block 14, the changes are converted to features. In MPEG, this is done by compressing the prediction error using a 2-dimensional 8×8 DCT.

Most video compression techniques based on DCT or subband encoders have focused on high precision techniques that attempt to encode video information without a loss of accuracy in the transform stage. Such high precision encoding techniques, however, rely on relatively expensive microprocessors, such as Intel Corporation's PENTIUM® processor, which have dedicated hardware to aid in the manipulation of floating point arithmetic and thereby reduce the penalty for maintaining a high degree of precision.

For many applications, however, such relatively expensive hardware is not practical or justified. Thus, a lower cost implementation, which also maintains acceptable image quality levels, is required. Known limited precision transforms that may be implemented on lower-cost hardware, however, tend to exhibit reduced accuracy as a result of the "lossy" nature of the encoding process. As used herein, a "lossy" system refers to a system that loses precision through the various stages of the encoder and thereby lacks the ability to substantially reconstruct the input from the transform coefficients when decoding. The inability to compensate for the reduced accuracy exhibited by these low precision transforms have been an impediment to the use of such transforms.

In view of the foregoing, there is a need for a video encoder that performs the motion compensation in the transform domain, thereby eliminating the requirement of an inverse transform in the encoder and enabling a simple control structure for software and hardware devices. There is also a need in the art for a video encoder having a class of transforms which are suitable for low precision implementation, including a control structure which enables low cost hardware and high speed software devices.

SUMMARY OF THE INVENTION

The subject invention is directed to a novel and unique apparatus and method for compressing data. More particularly, the present apparatus and method are adapted and configured to more efficiently encode data representing, for example, a video image, thereby reducing the amount of data that just be transferred to a decoder.

The invention concerns a method of compressing data that includes a first data set and a second data set. The method includes transforming the first and second data sets into corresponding first and second transform coefficient sets. Thereafter, data is generated which represents differences between the first and second transform coefficient sets. The generated data is then encoded for transmission to the decoder.

Transforming the first and second data sets may be performed utilizing a tensor product wavelet transform. Further, the remainders resulting from the transforming process may be transmitted from one subband to another subband.

The data representing differences between the first and second transform coefficient sets is generated by estimating the differences between the first and second transform coefficients sets to provide motion vectors. The motion vectors are applied to the first transform coefficient set to produce a prediction of the second transform coefficient set. The prediction is subtracted from the second transform coefficient set resulting in a set of prediction errors. The first and second transform coefficient sets can be error corrected to ensure synchronization between the encoder and the decoder.

In estimating the differences between the first and second transform coefficient sets a search region is generated about a subset of the transform coefficients from one of the first and the second transform coefficient sets. Thereafter, a related subset of transform coefficients is applied from the other of the first and the second transform coefficient sets to the search region. Then, the related subset of transform coefficients is traversed incrementally within the search region to a position representing a best incremental match. The related subset can then be traversed fractionally within the search region to a position representing a best fractional match.

Another embodiment of the method of compressing data that includes a first data set and a second data set includes transforming the first and second data sets into corresponding first and second collections of subbands. Then, generating data representing the differences between the first and second collections of subbands. The data may be generated, for example, by carrying out a motion compensation technique. The motion compensation technique may provide output such as motion vectors and prediction errors. Thereafter, the generated data is encoded for transmission to the decoder.

An embodiment may also the second collection of subbands macro-block packed to form a subband macro-block grouping. Thereafter, the generated data may be obtained through a motion compensation technique as follows. The differences between the first collection of subbands and the subband macro-block grouping is estimated to provide motion vectors. The motion vectors are applied to the first collection of subbands producing a prediction of the second collection of subbands. The prediction is then subtracted from the second collection of subbands resulting in a set of prediction errors.

The differences can be estimated between the first collection of subbands and the subband macro-block grouping as follows. A search region is generated about a subset of transform coefficients from the first collection of subbands. A related subset of transform coefficients from the subband macro-block grouping is applied to the search region. The related subset of transform coefficients is then traversed incrementally within the search region to a position representing a best incremental match. Then, the related subset of transform coefficients is traversed fractionally within the search region to a position representing a best fractional match.

A subband macro-block packing method is also disclosed for organizing subband blocks of a collection of subbands derived from a transform of an image. The method includes disassociating a set of related subband blocks from a collection of subbands that correspond to an image macro-block in the image. The set of related subband blocks are packed together as a subband macro-block. The steps of the disassociating and packing related subband blocks are repeated for each set of related subband blocks in the collection of subbands to form a subband macro-block grouping.

The method for macro-block packing may be further refined by arranging the set of related subband blocks within the subband macro-block in the same relative position the subband blocks occupy in the collection of subbands/ The method may also include locating the subband macro-block with the subband macro-block grouping in the same spatial location as the corresponding image macro-block is located within the image macro-block grouping.

After macro-block packing, changes can be detected between the first subband macro-block grouping (reference) and a subsequent second subband macro-block grouping. Detecting is based on a distortion evaluation according to a general equation of the form:

$$e_c = \sum_i W_i \|G - R\|_x^{P_x};$$

where $e_c$=measurement of distortion relative to reference R;
$W_i$=applied weight;
G=transform coefficients of the second subband macro-block grouping; and
R=reference (e.g., first subband macro-block grouping).

A more specific form of the equation for evaluating distortion is of the form:

$$e_c = W_0 \|G-R\|_2^2 + W_1 \|G-R\|_\infty^2.$$

Another embodiment of the present invention is described as a finite precision method for transforming a data set into transform coefficients wherein the data set is transformed utilizing a tensor product wavelet pair and the remainders emanating therefrom are propagated to the opposite filter path. More particularly, the embodiment may include determining a low pass component and a high pass component of an image. The low pass component is normalized to generate a low pass normalized output and a first remainder (rl). Likewise, the high pass component is normalized to generate a high pass normalized output and a second remainder (rh). A first operation (g(rl,rh)) is performed on the first and second remainders (rl, rh) and added to the results emanating therefrom to the approximation. And, a second operation (f(rl,rh)) is also performed on the first and second remainders (rl, rh) and added to the results emanating therefrom to the detail. It is important to note that the propagation of the remainders (propagation of errors) can be used in any transform, not just the tensor product.

The above finite precision method results in an overcomplete representation of an image. The method may include downsampling, for example, by two (2), of the high and low pass components to obtain the necessary and sufficient transform coefficients representing the image in the transform domain.

An embodiment of the finite precision method includes a low pass filter having the value −1, 2, 6, 2, −1 and a high pass filter having the value −1, 2, −1. The first operation (g(rl,rh)) and the second operation (f(rl,rh)) have the functions:

$g(rl,rh)=rh;$ and $f(rl,rh)=\text{floor}(rh+½)$, where nh=½.

A particular example of a tensor product wavelet transform including the above has the form:

$$D_i = X_{2i} - \left\lfloor \frac{X_{2i-1} + X_{2i+1}}{2} \right\rfloor; \text{ and}$$

$$A_i = X_{2i+1} + \left\lfloor \frac{D_i + D_{i+1} + 2}{4} \right\rfloor;$$

where:

$X_{2i}$=input data;

$X_{2i-1}$=data that precedes input data $X_{2i}$;

$X_{2i+1}$=data that follows input data $X_{2i}$;

$D_i$=detail term (decimated high pass filter output);

$D_{i+1}$=detail term that follows detail term $D_i$; and $A_i$=approximation term (decimated low pass filter output).

Also disclosed is an encoder apparatus for predicting changes between a sequence of frames in the transform domain. The apparatus includes a transformation device, having an input configured to receive a first and second frame of the sequence of frames, and further configured to generate therefrom a corresponding first and second collection of subbands that each support a set of transform coefficients. A motion compensation device, having an input coupled to the transformation device, is configured to receive the first and second collection of subbands, and further configured to efficiently represent differences between the first and second collection of subbands. Also included is a difference block having an input coupled to the transformation device and an input coupled to the output of the motion compensation device. The input received from the motion compensation device is subtracted from the second collection of subbands in the difference block, thereby generating a prediction errors.

The motion compensation device includes a motion estimation device configured to compare the first and second collection of subbands. A collection of motion vectors is generated therefrom which approximately represent the differences between the first and second collections of subbands. The motion compensation device also includes a motion prediction device, having an input coupled to the motion estimation device, configured to receive the motion vectors and the first collection of subbands, and further configured to generate therefrom a prediction grouping representing a prediction of the second collection of subbands. The prediction of the second collection of subbands is subtracted from the second collection of subbands in a difference block resulting in prediction errors.

A finite precision transforming apparatus is also disclosed for transforming an image frame into the transform domain. The apparatus includes a low pass component and a high pass component arranged in parallel and sharing an input that is configured to receive the image frame. A low pass normalizing device is included which has an input configured to receive the output of the low pass component and is further configured to produce a low pass normalized output and a first remainder (rl). A high pass normalizing device has an input configured to receive the output of the high pass component and is further configured to produce a high pass normalized output and a second remainder (rh). A first operation device has an input configured to receive the first remainder (rl) and the second remainder (rh) and further configured to calculate a first calculation (g(rl,rh)) thereby generating a first calculation result. A second operation device has an input configured to receive the first remainder (rl) and the second remainder (rh) and configured to calculate a second calculation (f(rl,rh)) thereby generating a second calculation result. In addition, a first adder has an input configured to receive the low pass normalized output and the first calculation result, the first adder generating a subband approximation. Similarly, a second adder has an input configured to receive the high pass normalized output and the second calculation result, the second adder generating a subband detail.

The finite precision transforming apparatus further includes a first downsampler at the low pass output and a second downsampler at the high pass output. A downsampling of two (2) provides sufficient and necessary transform coefficients to reconstruct the input image in the decoder.

These and other unique features of the apparatus and method disclosed herein will become more readily apparent from the following detailed description taken in conjunction with the drawings.

BRIEF DESCRIPTION OF THE DRAWINGS

Representative embodiments of the present invention will be described with reference to the following figures:

FIGS. 6(a) and 6(b) are schematic block diagrams illustrating filter banks for transforming and decimating an input image and their respective vertical and horizontal subbands created from each filter bank;

DETAILED DESCRIPTION OF THE PREFERRED EMBODIMENTS

An embodiment of the present invention provides an apparatus and method for compressing digital video signals using a limited precision transformation technique. The embodiment improves on conventional loss-less or lossy transform based techniques by motion compensating, e.g., estimating and predicting motion, in the transform domain, rather than in the time domain as in the prior art. In this manner, improved image quality can be achieved on less expensive hardware.

The term "motion compensation" is intended to be defined in its broadest sense. In other words, although motion compensation is often described and is illustrated herein as including motion estimation and motion prediction of a group of picture elements, it should also be understood to encompass, for example, rotation and scale. In addition, the term "motion compensation" may include, for example, simply generating data representing differences between two sets of data.

Compression efficiencies are gained by both converting the image to features and mapping the features first. The disclosure herein is illustrated as it relates to a sequence of images or video frames. Such an image sequence can be readily understood to be a collection of spatially oriented data elements (either scalar, vector, or functional) which are placed in arrangement with each other and are indexed by time or some other parameter. An image sequence can be in Cartesian coordinates, but other coordinate systems in the art can be used.

In addition, the present apparatus and method can be utilized in non-video applications such as speech, audio, and electrocardiogram compression. That is, even though the invention disclosed herein is illustrated on a two-dimensional system (2 D), i.e., video compression, it is intended that the teachings can be applied to any other dimensional systems so to advance the art of data compression in general.

For example, the teachings can be applied to one and one-half dimensional systems (1½ D) such as ultra-sound imaging. Also, the teachings can be applied to three dimensional systems (3 D) such as magnetic resonance imaging (MRI).

Throughout the description below, the term "frame" refers to a single image of a sequence of images fed to an encoder, regardless of the form of the single image, i.e., regardless if it is in the time domain, the frequency domain, or of any other processing that has been done on it. In addition, the term "pel" is used in reference to a picture element in the time domain and the terms "coefficient" and "transform coefficient" are used in reference to representations of the pels which are generated after the pels have passed through, for example, a forward wavelet transform. These terms are used to facilitate the description of the embodiments and are in no way intended to restrict the scope of the invention.

Figure 1:
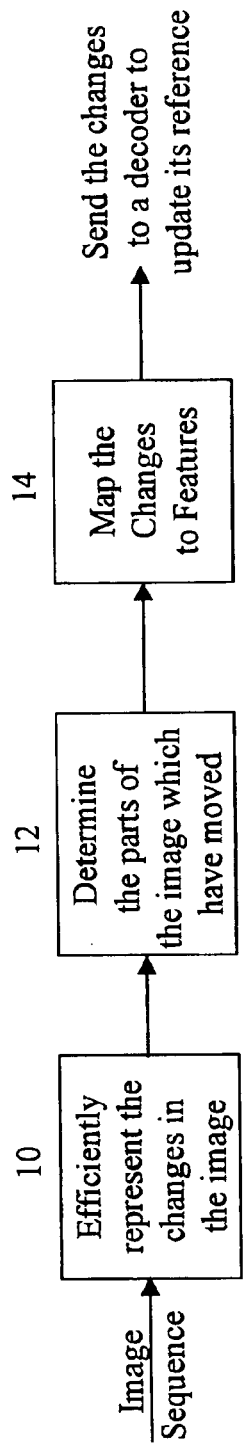
FIG. 1 is a schematic block diagram of a prior art standard video compression approach using the Discrete Cosine Transform (DCT) wherein motion compensation is carried out in the image domain.
Figure 2:
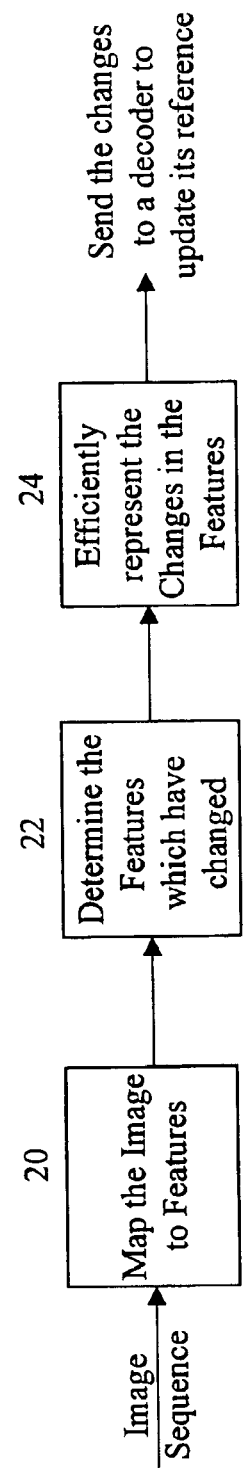
FIG. 2 is a schematic block diagram illustrating a general arrangement of an embodiment of the present invention including provisions for motion compensation to be carried out in the transform domain.

Referring now to the drawings wherein like reference numerals identify similar elements of the subject invention, there is illustrated in FIG. 2 a schematic block diagram of an embodiment for compressing a sequence of images or sequence of frames. This diagram is one of several embodiments disclosed herein. More detailed embodiments are discussed in the paragraphs that follow.

In FIG. 2, an image is converted to a collection of features in the transform domain in block 20. The features that are determined to be significant for that image, i.e., those features that are determined to have significantly changed from a past or reference frame, are selected in block 22. The significant features are efficiently represented in block 24 and, thereafter, sent to a decoder to update the features in a reference frame.

For example, the original image is transformed in block 20 and represented by a transform coefficient set. The transform coefficients of the coefficient set are then evaluated in block 22 to determine their significance via various weighting and evaluation techniques and ranked according the their significance. Thereafter, in block 24, motion compensation between the present frame and past or reference frame takes place. Motion compensation may include motion estimating the change between frames to generate a set of motion vectors. Thereafter, the motion vectors are applied to a reference frame during a motion prediction step. The results from motion prediction are subtracted from the transform coefficient set to determine the errors of that prediction. The prediction errors are then optionally scaled and finally positionally encoded along with the motion vectors for transmittal to the decoder.

Figure 3:
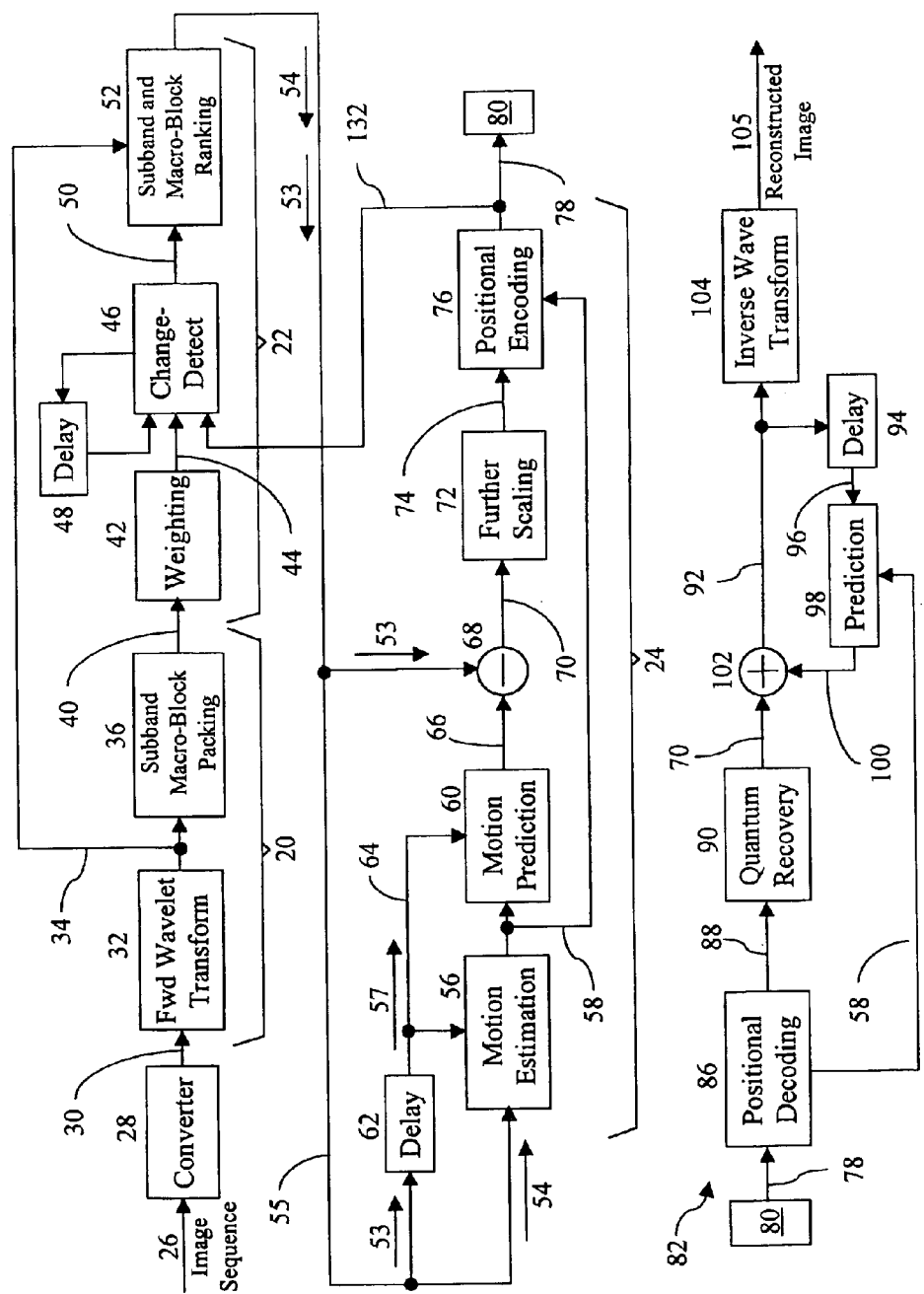
FIG. 3 is a schematic block diagram of a more detailed arrangement of the embodiment illustrated in FIG. 2.

Referring to FIG. 3, a schematic block diagram illustrates a more particular arrangement of the embodiment that was described with reference to FIG. 2. An image sequence or series of video frames 26 encoded in, for example, Caltech Intermediate Format (CIF) are fed to a converter 28. A CIF frame has 288×352 pels. In converter 28 the frames are converted to quarter CIF (QCIF), for example, QCIF image 30 as illustrated in FIG. 4a. A QCIF image has 144×176 pels. CIF is converted to QCIF by low-pass filtering and decimating by two (2) in both the horizontal and vertical directions. To facilitate processing, the 144×176 pels are divided into image macro-blocks ($IMB_{X,X}$) each having 16×16 pels. QCIF is used herein as an example only and is not intended in any way as a limitation with respect to this invention. The techniques described below are readily adaptable to other image (and non-image) formats by methods well known to those skilled in the art.

Figure 4:
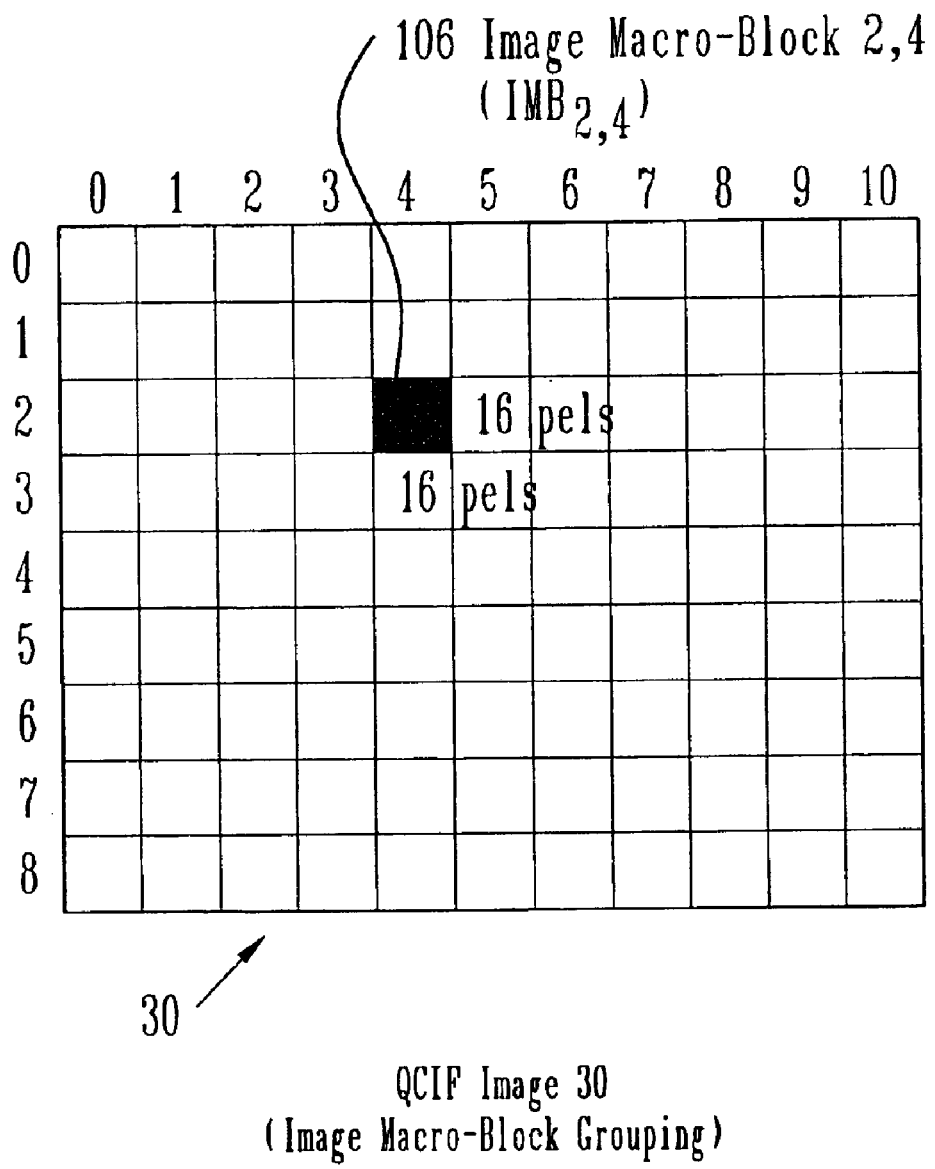
FIG. 4(a) illustrates a QCIF image having image macro-blocks ($IMB_{X,X}$) 0,0 through 8,10
FIG. 4(b) illustrates a subband representation of the QCIF image after the image frame has been transformed by a forward wavelet transform.
Figure 4:
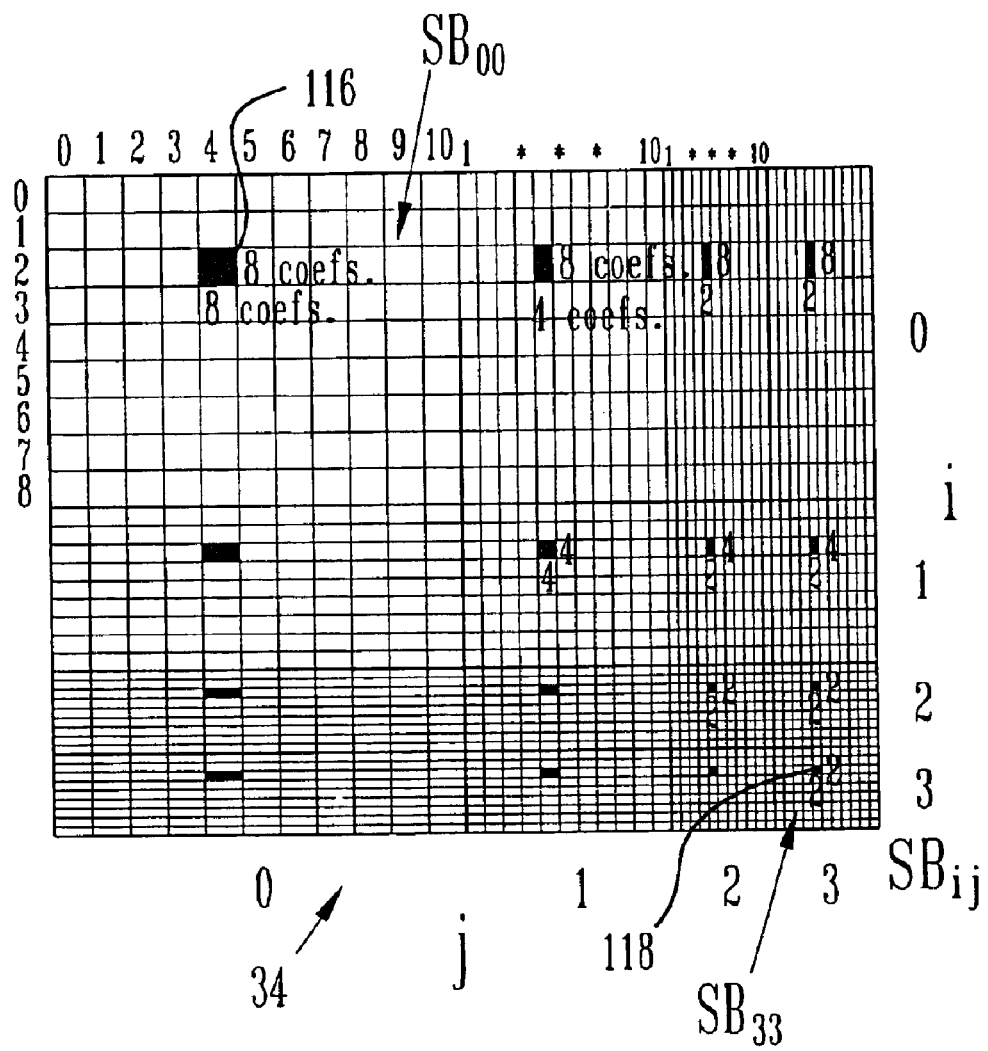

Referring to FIGS. 3 and 4, QCIF image 30 is fed to blocks 32 and 36, which make up block 20 of FIG. 2, wherein mapping of the images to features takes place. More specifically, QCIF image 30 (FIG. 4(a)) is fed to block 32 wherein a forward wavelet transform transforms each frame to a collection of subbands 34 (FIG. 4(b)). This organization of the transformed image, i.e., collection of subbands 34, is stored in memory for later use, for example, for motion estimation, motion prediction, and determining prediction error. An appropriate forward wavelet transform that may be used for this invention is discussed in greater detail herein below.

The collection of subbands 34 are fed to block 36 for subband macro-block packing. During subband macro-block packing, the subband blocks that correspond to a particular image macro-block are organized to form subband macro-blocks ($SMB_{X,X}$). Thereafter, each subband macro-block resides at the spatial location of the image macro-block which it is related to and therefore represents. The collection of all subband macro-blocks for a particular frame is called a subband macro-block grouping 40.

Figure 5:
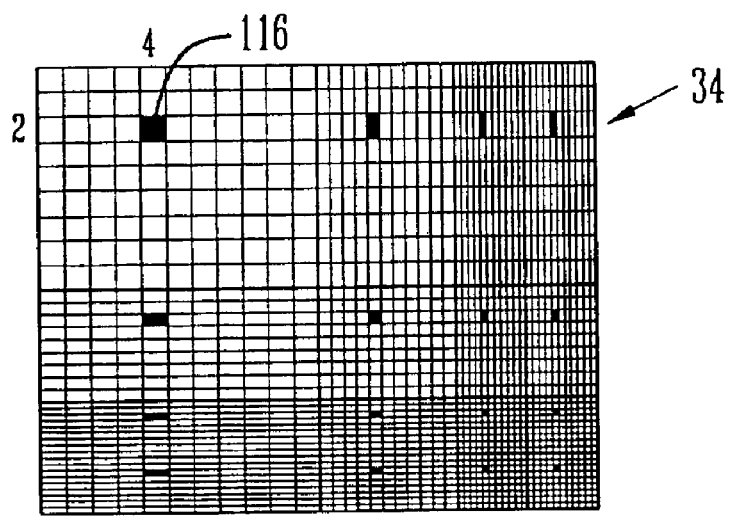
FIG. 5(a) illustrates the subband representation of the QCIF image as illustrated in FIG. 4(b)
FIG. 5(b) illustrates a collection of subband macro-blocks ($SMB_{X,X}$) generated from the subband representation illustrated in FIG. 5(a)
FIG. 5(c) illustrates the organization of the subband macroblocks of FIG. 5(b) so that the subband macro-blocks ($SMB_{X,X}$) correspond spatially with their related image macro-blocks ($IMB_{X,X}$) of FIG. 4(a)
Figure 5:
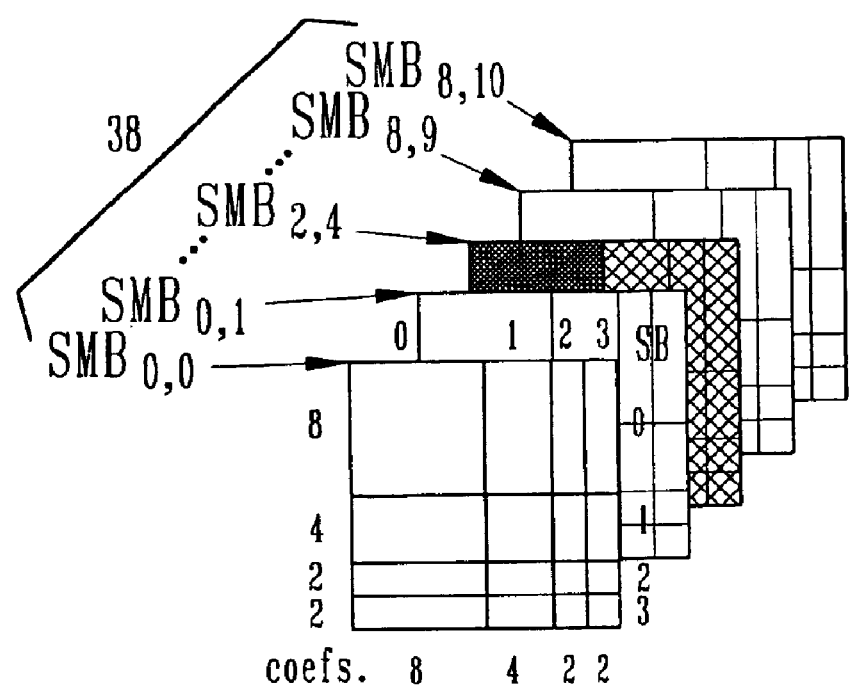

FIG. 5 illustrates the process of subband macro-block packing. During subband macro-block packing, all related subband blocks in the collection of subbands 34 (FIG. 5(a)) are reorganized during subband macro-block packing to form subband macro-blocks 38 as illustrated in FIG. 5(b).

Figure 5C:
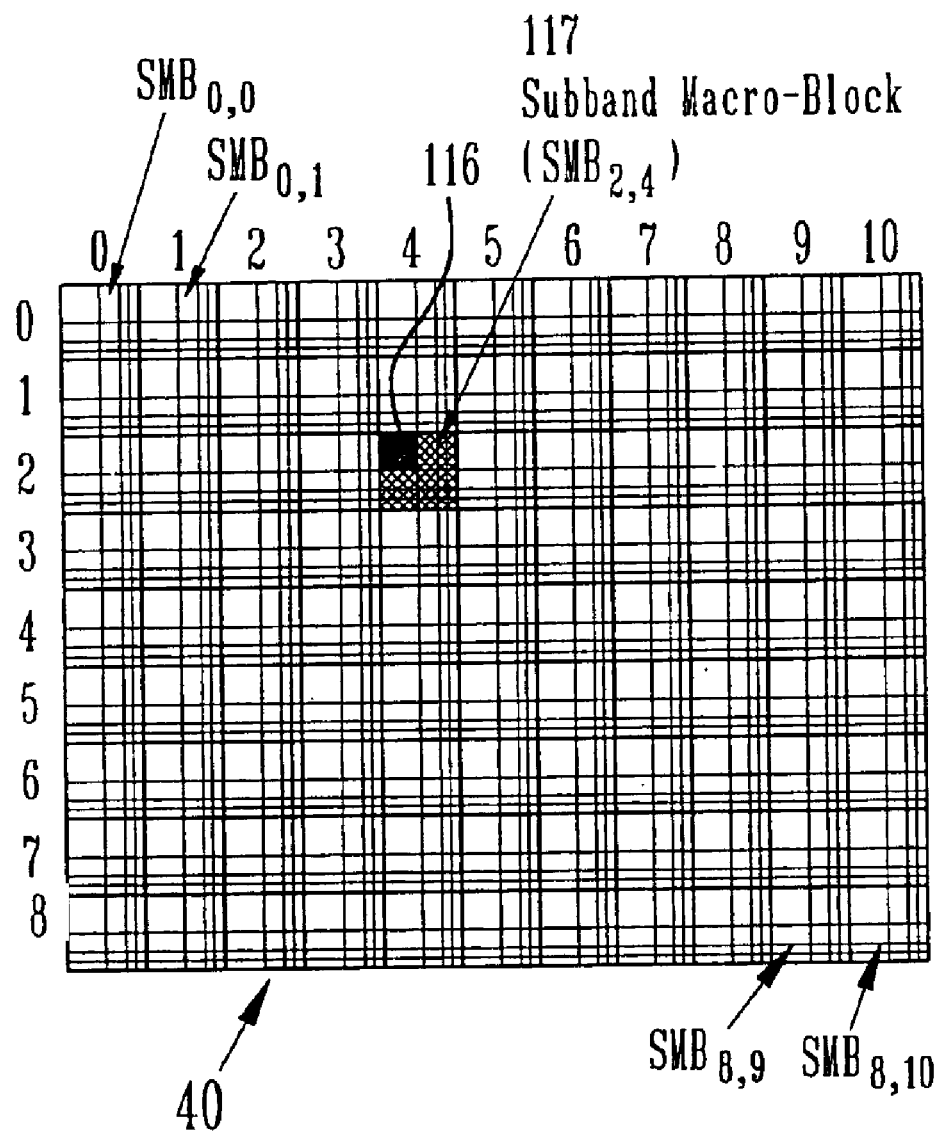

For example, the shaded subband blocks in FIG. 5(a), corresponding to image macro-block 2,4 ($IMB_{2,4}$) in FIG. 4(a), are reorganized during subband macro-block packing in block 36 (FIG. 3) to form subband macro-block $SMB_{2,4}$ as illustrated FIG. 5(b). The subband macro-blocks 38 ($SMB_{0,0}$ through $SMB_{8,10}$) are then organized into subband macro-block grouping 40 as illustrated in FIG. 5(c) such that each subband macro-block is supported by the spatial position of its corresponding image macro-block ($IMB_{X,X}$) in QCIF image 30. In this example, $SMB_{2,4}$ is found to be significantly supported by the spatial location of $IMB_{2,4}$ as illustrated in FIGS. 4(a) and 5(c).

It is important to note again that although the embodiment described herein refers only to frame images represented in QCIF, those skilled in the art will readily understand that other formats may be used without deviating from the teachings of this invention. It is also important to note that the particular grouping of subband blocks in each subband macro-block is used to accommodate the particular wavelet illustrated. Other groupings of subband data exist which would be more appropriate for other wavelets.

From the above descriptions of the collection of image macro-blocks 30 (FIG. 4(i a)), the collection of subbands 34 (FIG. 4(b)), and the subband macro-block grouping 40 (FIG. 5(c)) it should be readily apparent that there is a correlation between certain image macro-blocks, subband blocks, and subband macro-blocks. An example of such a correlation is as follows: (a) image macro-block 2,4 ($IMB_{2,4}$), which is shaded and also identified as image macro-block 106 in FIG. 4(a); (b) all of the shaded subband blocks in FIG. 4(b), for example, subband block 116 in subband 00 ($SB_{00}$) and subband block 118 in subband 33 ($SB_{33}$); and (c) subband macro-block 2,4 ($SMB_{2,4}$), which is shaded and also identified as subband macro-block 117 in FIG. 5(c). Descriptions in this specification that involve coefficients having a relationship such as that exemplified above may be referred to as being 'related'.

Referring again to FIG. 3, subband macro-block grouping 40 is fed to blocks 42, 46, 48, and 52, which make up block 22 found in FIG. 2, where it is determined which features or subband macro-blocks ($SMB_{0,0}$ through $SMB_{8,10}$) have changed. In particular, subband macro-block grouping 40 is fed to block 42 wherein weights are applied to scale each subband macro-block in subband macro-block grouping 40 by an amount which equalizes the perceptual importance of the subband macro-block. The output of weighting block 42 is weighted grouping 44.

Perceptual importance through weighting can be determined, for example, through a Mean Opinion Score study, or determined from weights used in other coding systems such as those found in H.261 and H.263 of the Consultative Committee for International Telegraph and Telephone (CCITT), the standards of which are incorporated by reference herein. For a discussion of Mean Opinion Scoring see *Discrete Cosine Transform,* K. R. Rao & P. Yip, Academic Press, Inc., pp. 165–74 (1990), incorporated by reference herein.

After weights have been applied in block 42 to scale each subband macro-block, weighted grouping 44 is fed to and processed in change detect block 46 to determine the relative amount of change that has occurred. This change is also termed the 'significance' or, for the purpose of video, the distortion of weighted grouping 44. Significance can be determined in relation to a given reference such as, for example, zero (0) or a past weighted grouping. The loop extending from change-detect block 46 includes a frame delay 48 which returns a past weighted grouping to change-detect block 46 for use as a reference. The output of change-detect block 46 is change detected grouping 50.

A zero (0) reference is used in change detect block 46, for example, when initially transmitting frames through the encoder. In this case, the entire frame is referenced to zero (0). This is also known as intraframe referencing. As described above, a past weighted grouping can also be used wherein the macro-block grouping is weighted in block 42 as described above and thereafter delayed in delay block 48 of change-detect block 46 for use as a reference. This later method, also known as interframe referencing, eliminates repeatedly sending redundant and/or unimportant information to the decoder.

An alternative use of zero (0) frame referencing is for reproducing and maintaining a relatively accurate reference image at the decoder during system operation. One method employs periodically applying a zero (0) reference to the entirety of every eighth (8th) frame of the standard 30 frames/second. Alternatively, the image can be stoichastically refreshed such as by randomly, or methodically, referencing subband blocks to zero (0). To facilitate any process that references all or a part of a frame to zero (0), the zero-referenced subband blocks are identified as such so to prevent motion compensation operations (described below) to be performed on the effected blocks. Thus, the identified subband blocks are reproduced in whole at the decoder for refreshing either the entire reference or a part of the reference therein, as the case may be.

Referring again to FIG. 3, the collection of subbands 34 that were earlier stored in memory and the subband macro-blocks of change-detected grouping 50 are ranked in block 52 according to the amount each subband block is determined to have changed, i.e., in accord with their significance. Ranking is based on the values previously assigned by weighting and detecting the subband macro-blocks in blocks 42 and 46, respectively. The output of block 52 includes a ranked subband grouping 53 and a ranked subband macro-block grouping 54 which are transmitted over line 55.

With continued reference to FIG. 3, ranked subband grouping 53 and ranked subband macro-block grouping 54 are selectively fed to blocks 56, 60, 62, 68, 72, and 76, which correspond to block 24 of FIG. 2, wherein the changed macro-blocks are efficiently represented. In particular, ranked subband macro-block grouping 54 (the 'present' frame) is fed to block 56 for motion estimation. Ranked subband grouping 53 is fed to delay block 62, thereafter providing a delayed ranked subband grouping 57 (the 'reference' frame) to line 64 for motion estimation and motion prediction in blocks 56 and 60, respectively. A collection of motion vectors 58 are generated in motion estimation block 56, in a manner to be described below, and fed to block 60 for motion prediction and also sent to block 76 for positional encoding.

The motion vectors 58 sent to motion prediction block 60 are used to alter delayed ranked subband grouping 57 so to generate a predicted grouping 66. A difference block 68 receives ranked subband grouping 53 and subtracts predicted grouping 66 therefrom, resulting in grouping differences 70, i.e., the prediction error. The grouping differences 70 are further scaled in block 72 resulting in scaled grouping differences 74. Those skilled in the art will recognize that the fewer the number of non-zero grouping differences 70, the more accurate the collection of motion vectors 58 have predicted the changes between the present frame and the reference frame. And, the fewer the differences the less bits that must be transmitted to the decoder to correct for deficiencies in motion estimation.

The scaled grouping differences 74 from scaling block 72 and the collection of motion vectors 58 from motion estimation block 56 are positionally encoded as macro-blocks in block 76. Therein, the data is efficiently organized into a bit stream. Encoded bit stream grouping 78 is output from block 76 and transmitted via transmission line 80 to a decoder 82 for inverse processing. Transmission can be through a variety of mediums, for example, electronic, electromagnetic, or optical.

Regarding bit stream formatting, there are several standard methods well known in the art for formatting bit streams. The format used in an H.263 based encoder system is one example. A bit stream is basically a serial string of bit packets. Each packet representing a particular category of data.

For example, bit packets may include system level data, video, control, and audio data. As data is received for positional encoding in block 76, it is organized into bit packets in accordance with the format in use. Generally, a collection of bit packets representing a video frame starts with a bit identifying it as a new frame. The amount of quantization and other control codes typically follow. Thereafter there is encoded a list of macro-blocks representing the scaled grouping differences 74. For QCIF, the number of macro-blocks equals ninety-nine (99). (See FIG. 5(c).)

To facilitate more efficient transfer of data, each macro-block is proceeded by a macro-block zero bit (MBZero-bit) which indicates the presence or absence of non-zero data in a macro-block. If the macro-block is present, control information for the macro-block, including the related collection of motion vectors 58, is sent followed by the subband data, i.e., the related scaled grouping differences 74. Including such information substantially reduces the number of bits that are sent over transmission line 80 in that the absence of a macro-block is represented by a single symbol instead of the all of the bits that would be necessary to identify the entire string of macro-block coefficients that are equal to zero.

Another situation wherein further efficiencies can be had is when only some of the subband blocks within a subband macro-block are zero. An embodiment includes the step of flagging the subbands whose coefficients are equal to zero with a subband zero flag (SBZero flag). A subband from scaled grouping differences 74 whose coefficients are zero indicates that no changes were found to exist between corresponding subband blocks of ranked subband grouping 53 and predicted grouping 66. It takes substantially fewer bits to represent SBZero flags than to separately represent each coefficient equaling zero. Of course, the decoder is programmed to recognize both the MBZero-bit and the SBZero flag so to interpret the symbol introduced during positional encoding in block 76. An example of zero-runs length codes for symbolizing strings of zeros follows.

Zero-Runs Length Codes

| Zero Code | Number of Consecutive Zeros |
| --- | --- |
| 01 | single zero |
| 001 $b_0$ | 2,3 |
| 0001 $b_1 b_0$ | 4,5,6,7 |
| 00001 $b_2 b_1 b_0$ | 8,9,10,11,12,13,14,15 |
| 00000 1 $b_3 b_2 b_1 b_0$ | 16 . . . 31 |
| zeros($\log_2(N)$)$n_{MSB-1} n_{MSB-2} \cdots n_1 n_0$ | For general N |

With continued reference to FIG. 3, encoded bit stream grouping 78 is received by decoder 82 via transmission line 80 and is fed to a positional decoding block 86 which reverses the effect of positional encoding block 76. The collection of motion vectors 58 are extracted from bit stream grouping 78 and fed to a prediction block 98. The decoded scaled grouping differences 88, in subband form (FIG. 4(b)), are provided to a quantum recovery block 90. In quantum recovery block 90, past transform coefficients, and past and present dequantization terms are used to recover the quantized transform coefficients' values, i.e., they are used to recreate the grouping differences 70.

A collection of subbands 92, the encoder's reference frame, is fed to a delay block 94. A delayed collection of subbands 96 is fed from the delay block 94 to a prediction block 98. Similar to the process carried out in motion prediction block 60 of the encoder, the collection of motion vectors 58 are applied to the delayed collection of subbands 96 in prediction block 98. Therein, the delayed collection of subbands 96 is altered to generate a predicted grouping 100, i.e., a subband representation of the updated image not including the grouping differences 70. Grouping differences 70 and predicted grouping 100 are added in an adder block 102 generating the collection of subbands 92, i.e., a new reference frame. Finally, an inverse wavelet transform is performed in block 104 on the collection of subbands 92. This step is essentially the reverse of the forward wavelet transform 32 that was briefly described above and which will be described in greater detail herein below. The resulting output from block 104 is a reconstructed image 105.

As previously described and illustrated in FIGS. 3 and 4, QCIF image 30 (FIG. 4(a)) is fed to forward wavelet transform 32 which transforms each video frame to form the collection of subbands (FIG. 4(b)). An embodiment of transform block 32 utilizes a tensor product wavelet transform. For a detailed discussion of tensor product wavelet transforms see *Standard Wavelet Basis Compression of Images,* Joel Rosiene and Ian Greenshields, Optical Engineering, Vol. 33, Number 8 (August 1994), incorporated by reference herein. Other finite precision transforms may be utilized such as the well-known Mallat, GenLOT, or Harr transforms. For a discussion of such suitable alternative wavelet transforms see *Wavelets and Filter Banks,* G. Strang and T. Nguyen, Wellesley-Cambridge Press (1997), incorporated by reference herein.

Referring to FIG. 4(b), there is illustrated the collection of subbands 34 after QCIF image 30 has passed through forward wavelet transform 32. As previously indicated, the forward wavelet transform process utilizes the tensor product wavelet transform or other well known finite precision transforms as modified herein to reduce the effects of a finite precision implementation. Generally, the transform process will consist of m×n stages to produce (m+1)×(n+1) subbands. In one embodiment, discussed below in conjunction with FIG. 6, the transform process consists of 3×3 stages to produce a total of sixteen (16) subbands. Other embodiments can be made following the disclosure provided herein that would be within the scope of this invention.

Referring to FIG. 6(a), a forward wavelet transform process initially filters a QCIF image frame 30 on a row-by-row basis using three stages. Each stage includes a low pass filter 108 and a high pass filter 110. In one embodiment, each low pass filter 108 has a value of −1, 2, 6, 2, −1 and each high pass filter has a value of −1, 2, −1.

After filtering, the low pass components and high pass components are scaled and decimated, or downsampled, at each stage by decimators 112 and 114, respectively, whereby components of the sample values comprising a discrete signal are eliminated. In the illustrated embodiment, the input image is downsampled by a factor of two (2) so to discard every other sample. Decimating by two (2) ultimately results in the necessary and sufficient transform coefficients to enable an exact reconstruction of the input. Thereafter, the downsampled values of the low pass components and high pass components are normalized at each stage in a manner that will be described in more detail herein below with respect to FIG. 7. The output of the first stage includes a low pass filter component $A_{OR}$ and a high pass component $D_{OR}$. Low pass component $A_{OR}$ is decomposed a second time and then a third time resulting in additional row details $D_{1R}$ and $D_{2R}$, and row average $A_{2R}$.

The row outputs $D_{OR}$, $D_{1R}$, $D_{2R}$, and $A_{2R}$ of the row stages shown in FIG. 6(a) are then applied on a column-by-column basis to the stages shown in FIG. 6(b). Each of the three stages shown in FIG. 6(b) include a filter pair, downsampling, and normalization processes that are applied in the same manner as discussed above in conjunction with FIG. 6(a). The transform output is a collection of subbands 34 as discussed above with regard to FIG. 3 and as illustrated in FIG. 4(b).

Referring now to FIG. 4(b), for identification purposes, each subband is identified by a subband designation $SB_{ij}$, where i=0, 1, 2, or 3 for each row and j=0, 1, 2, or 3 for each column. The shaded subband blocks, for example, subband block 116 in $SB_{00}$ and subband block 118 in $SB_{33}$, correspond with $IMB_{2,4}$ in QCIF image 30 of FIG. 4(a). Due to the decimation process described above, each corresponding subband block is reduced proportionally such that, for example, subband block 116 in $SB_{00}$ includes 8×8 coefficients and subband block 118 in $SB_{33}$ includes 2×2 coefficients. As discussed above, the related subband blocks, e.g., those subband blocks in each subband ($SB_{00}$ through $SB_{33}$) that are found in subband positions 2,4, are collected during the step of subband macro-block packing in block 36 (FIGS. 3 and 5) to facilitate certain processing steps.

Figure 7:
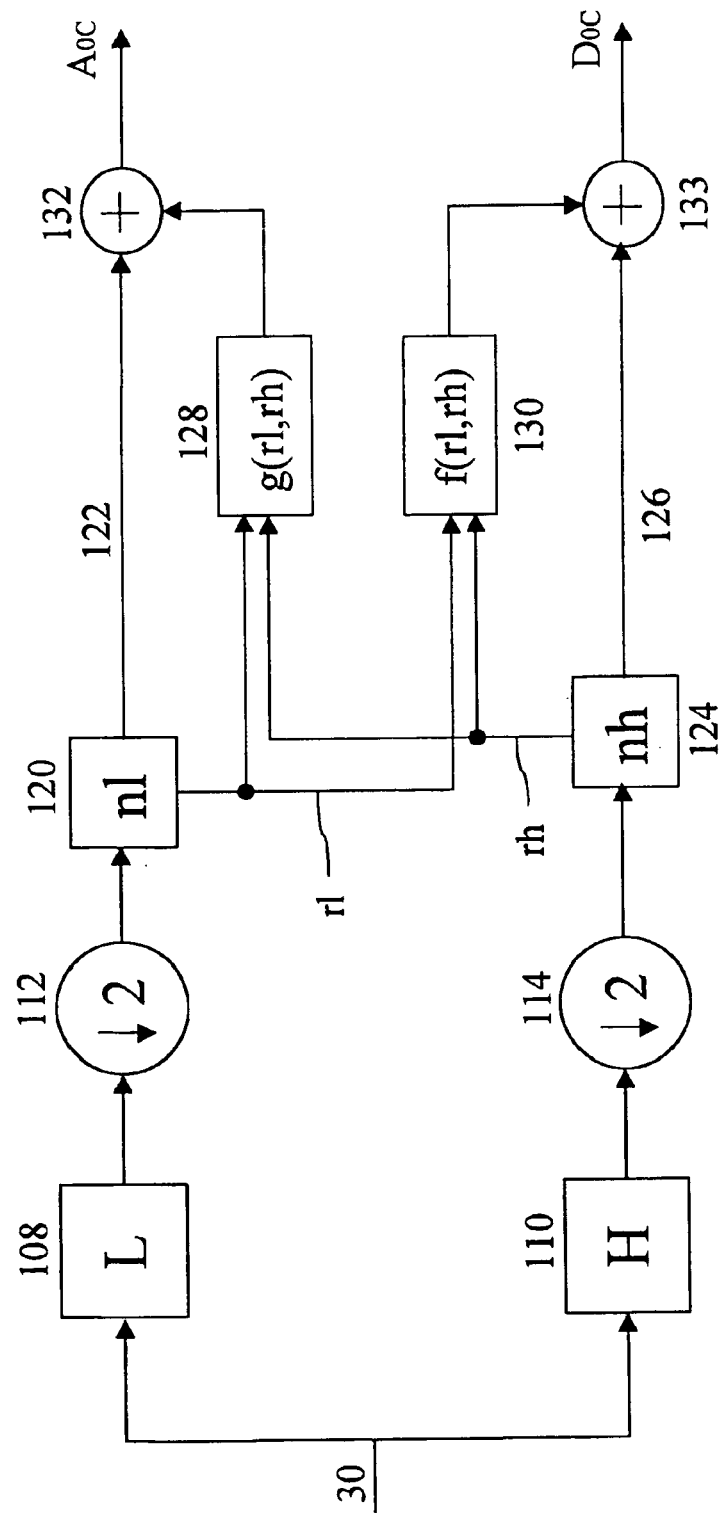
FIG. 7 illustrates an architecture for transferring the finite precision arithmetic in the filter banks from the high band region to the low band region and, conversely, from the low band region to the high band region.

Referring now to FIG. 7, in accordance with a feature of the disclosed embodiment, the remainder for each stage of the subband encoding process is propagated to the opposite filter path in order to compensate for errors introduced due to the finite precision transform. The propagated remainder is utilized to adjust the coefficients on the opposite filter path to account for the loss of precision. The process results in a non-linear transform. Further, the process by which the filters are altered may make them neither bi-orthogonal nor orthogonal.

FIG. 7 illustrates an implementation for propagating the remainders to opposite filter channels for the first stage of the row transform shown in FIG. 6(a). A similar implementation is included at each of the row stages and column stages. The coefficients of input frame 30 are filtered in low pass filter 108 and high pass filter 110 in the normal manner. The results are, respectively, downsampled in samplers 112 and 114. The decomposed results of low pass filter 108 are normalized in a low pass normalization process 120 producing a low pass normalized output 122 and a low pass remainder rl. The decomposed results of high pass filter 110 are normalized in a high pass normalization process 124 producing a high pass normalized output 126 and a high pass remainder rh. The remainders rl and rh resulting from each normalization process 120 and 124, respectively, are each passed through functions g(rl,rh) 128 and f(rl,rh) 130 as illustrated. The results of function g(rl,rh) 128 are added to low pass normalized output 122 in adder 132 resulting in $A_{OR}$ (first stage averages). The results of function f(rl,rh) 130 are added to high pass normalized output 126 in adder 133 resulting in $D_{OR}$ (first stage lost details).

For the filters L={−1, 2, 6, 2, −1} and H={−1, 2, −1}, an embodiment of the functions of the remainders are: f(rl,rh)=floor(rh+½) with nh=½; and g(rl,rh)=rh. The above described manipulation of the remainders is repeated for each filter pair, resulting in reduced bit allocation at the transform output.

An embodiment of a tensor product wavelet pair is of the form:

$$D_i = X_{2i} - \left\lfloor \frac{X_{2i-1} + X_{2i+1}}{2} \right\rfloor$$

$$A_i = X_{2i+1} + \left\lfloor \frac{D_i + D_{i+1} + 2}{4} \right\rfloor$$

where:

p1 $X_{2i}$=input data;

$X_{2i-1}$=data that precedes input data $X_{2i}$;

$X_{2i+1}$=data that follows input data $X_{2i}$;

$D_i$=detail term (decimated high pass filter output);

$D_{i+1}$=detail term that follows detail term $D_i$; and $A_i$=approximation term (decimated low pass filter output).

The above description of the tensor product wavelet transform illustrates a two-way split into high pass (details) and low pass (approximations) components. In addition, the description illustrates the possibility of propagating remainders from a first band to a second band, from the second band to the first band, or both from the first band to the second band and from the second band to the first. The embodiment described above is intended to illustrate the basic concepts of the invention and should in no way be interpreted to limit the scope of the invention.

For example, a tensor product wavelet transform can have a first stage where a three-way split includes a high pass filter, a medium pass filter, and a low pass filter. The output of the low pass filter can then be iterated, i.e., a second stage having a three-way split can be applied to the output of the low pass filter, resulting in a total of five (5) subbands. In such an embodiment the remainders could be propagated from the low pass filter and the high pass filter to the medium pass filter. This embodiment is just one example of how the tensor product wavelet transform can be varied and still remain in keeping with the scope and spirit of the disclosed invention. Those skilled in the art will readily understand that there are numerous other ways in which the input can be split at each stage and interated, and also that there are numerous other ways in which the remainders can be propagated between subbands.

In addition, the above description of the propagation of remainders is not intended to limit its used to a tensor product wavelet transform. It can be used with any transform. For example, the propagation of remainders can be used with a Discrete Cosine Transform (DCT). Also, the propagation of remainders can be used in a loss-less or lossy manner.

As discussed herein above, the output of forward wavelet transform 32 can be a complete representation or an over-complete representation of QCIF image 30. A complete representation of QCIF image 30 includes a collection of subbands that are just enough to represent the contents of the image. An over-complete representation of QCIF image 30 includes the complete representation and redundant, alternative, or additional subband representations to facilitate motion compensation as will be described herein below. Each representation has value in the disclosed embodiment. For example, the over-complete representation can include a variety of image changes, such as translational movement, rotational movement, and scaling. These changes can be recalled as necessary during motion compensation, reducing the problem of representing image changes to one of indexing.

It should be noted with regard to the forward wavelet transform described above that although the transformed image frame structures illustrated herein are for the luma components, the structures also hold for the chroma components and, therefore, have not been separately described.

Regarding change-detect block 46 described herein above with respect to FIG. 3, it is noted that a zero (0) reference, or some other reference such as, for example, a past weighted grouping supplied through delay 48, may be used to detect how much weighted grouping 44 has changed. An embodiment of change-detect block 46 includes a change detection metric, to which weighted grouping 44 is to be applied, of the general form:

$$e_c = \sum_i W_i \|G - R\|_x^{Px};$$

where: p1 $e_c$=a measurement of distortion relative to reference R;
W$_i$=applied weight;
G=a present grouping of subband transform coefficients; and
R=a reference such as, for example, zero (0) or a previous grouping of subband coefficients obtained through delay block 48.

A change detection metric may take the more specific form:

$$e_c = W_0 \|G-R\|_2^2 + W_1 \|G-R\|_\infty^2.$$

In addition, change-detect 46 can take advantage of information provided by a feed-back 132 (FIG. 3) from encoded bit stream grouping 78 to eliminate certain weighted macro-blocks in weighted grouping 44 if any are determined to be too expensive, in terms of bit allocation, to be output from change-detect 46. Further, change-detect block 46 may replace one feature, e.g., subband block, with another which it deems better representative of the feature.

As described herein above and illustrated in FIG. 3, ranked subband grouping 53 and ranked subband macro-block grouping 54 are fed to delay block 62 and block 56, respectively, via line 55 for motion estimation. At block 56 a comparison process is carried out between the subband blocks of ranked subband macro-block grouping 54, i.e., the 'present' frame, and related search regions of delayed ranked subband grouping 57, i.e., the 'reference' frame. Those skilled in the art will recognize certain advantages in utilizing ranked subband macro-block grouping 54 for the present frame and delayed ranked subband grouping 57 for the reference frame. However, it should also be recognized that other groupings and combinations that are in keeping with the teachings of this invention may be utilized. The comparison process carried out in block 56 results in a collection of motion vectors 58 which are fed to block 60 for motion prediction and to block 76 for positional encoding into a bit stream, as briefly described herein above.

Figure 8:
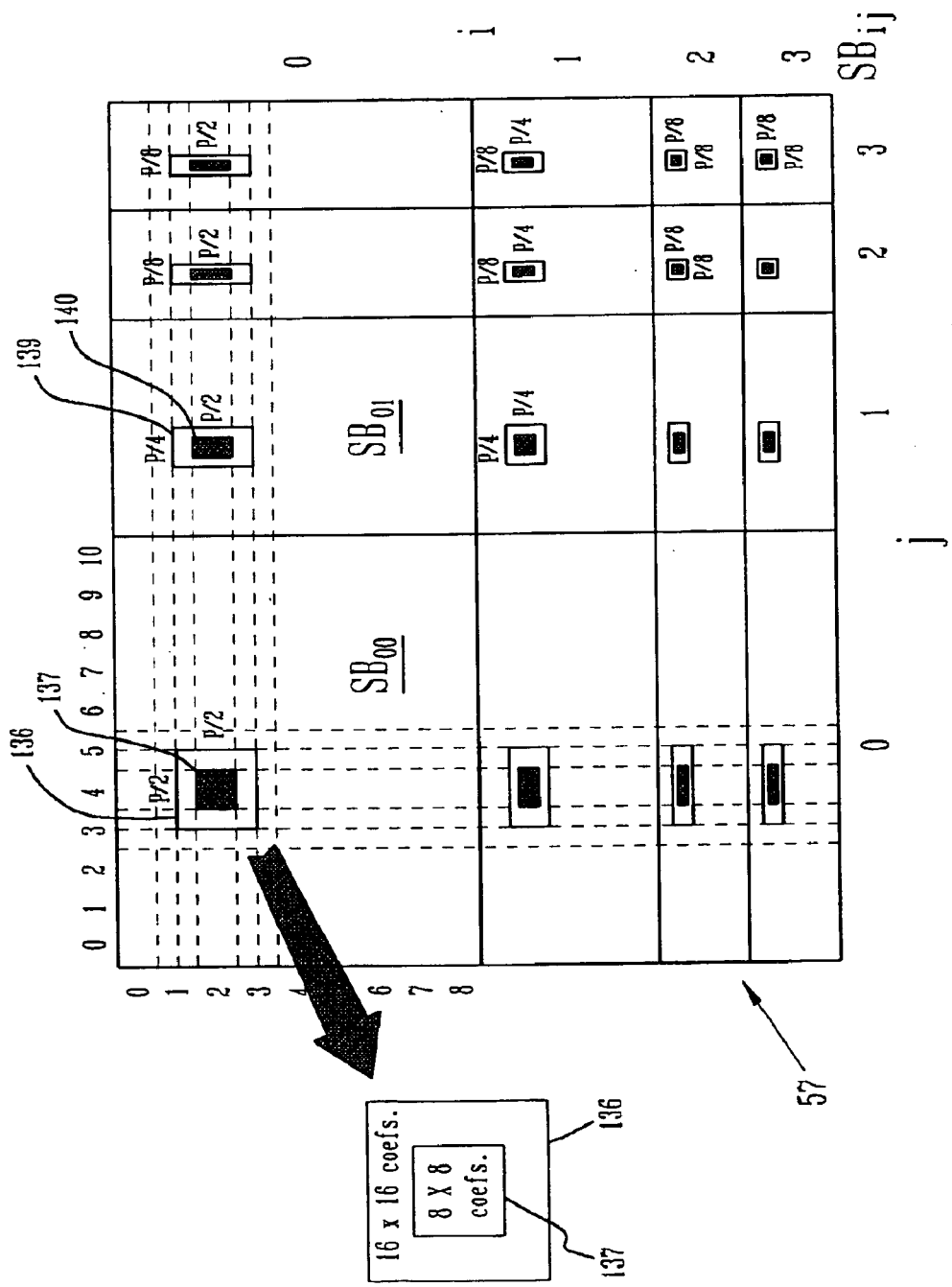
FIG. 8 illustrates search regions in the transform domain for each subband ($SB_{ij}$) corresponding to image macro-block 2,4 ($IMB_{2,4}$) in the image domain wherein the search band is P×P pels, and further details the search region for that of $SB_{00}$ when the input image size is in QCIF.
Figure 9:
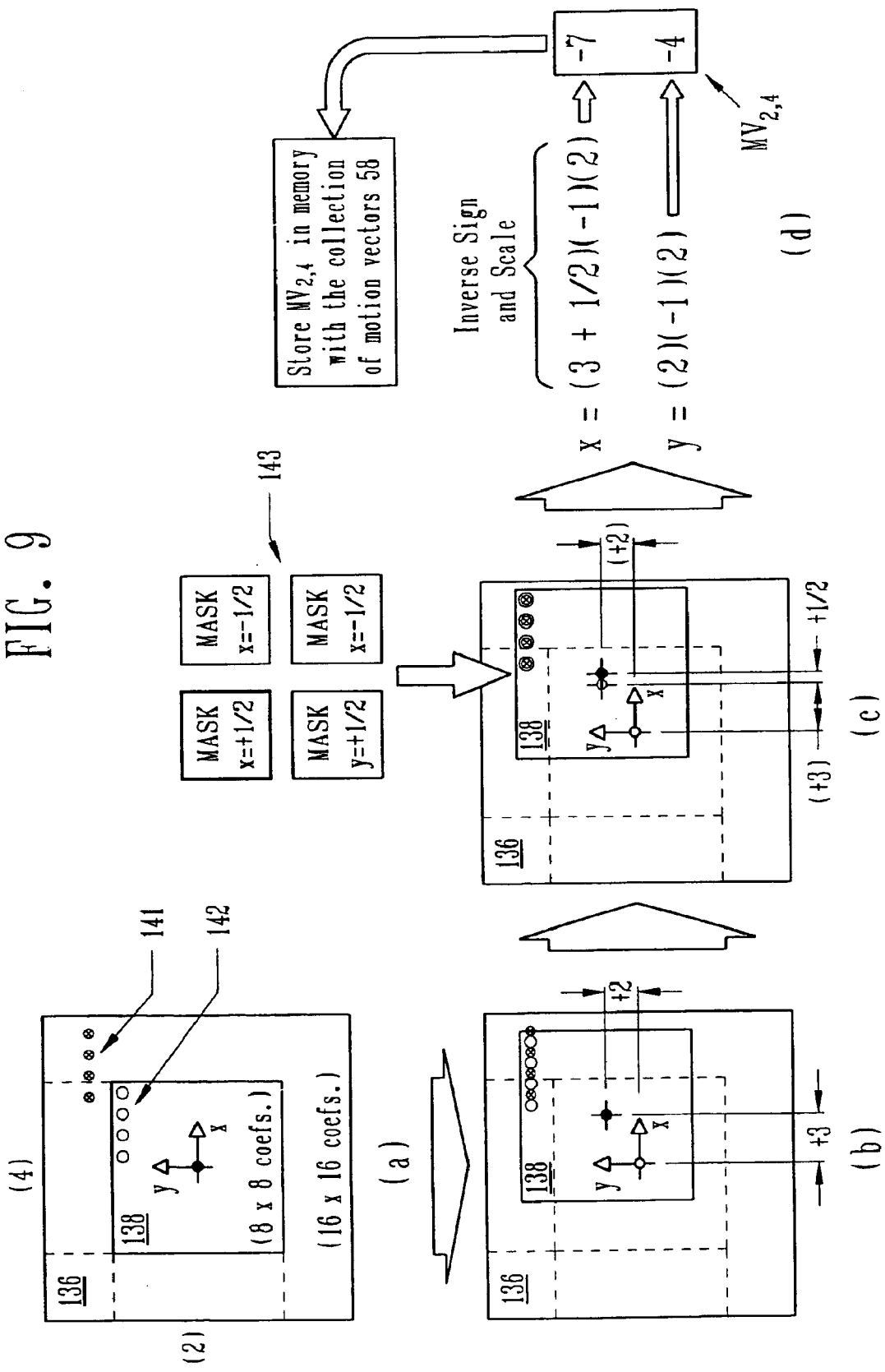
FIGS. 9(a) through 9(d) illustrate a method by which motion is estimated in the transform domain.

Referring to FIGS. 8 and 9, motion estimation in block 56 and the generation of a collection of motion vectors 58 will now be more particularly described. In FIG. 8, delayed ranked subband grouping 57 is illustrated. Delayed ranked subband grouping 57 is similar to the collection of subbands 34 illustrated in FIG. 4(b), but has been further processed by having its subband blocks ranked in block 52 (FIG. 3) and by having been delayed by at least one frame in delay block 62. To facilitate determining the individual motion vectors, search regions are defined about subband blocks in at least one of the subbands ($SB_{00}$ through $SB_{33}$). The subband blocks within each subband that are selected to have search regions defined about them are those that were defined as significant in change-detect block 46. It is often sufficient to develop the motion vectors based on the significant subband blocks within $SB_{00}$.

With continued reference to FIG. 8, there are illustrated search regions that have been developed about each subband block that corresponds to image macro-block 2,4 ($IMB_{2,4}$) of QCIF image 30 (FIG. 4(a)). The size of the search regions may be varied. However, the search regions about the subband blocks will always be proportional according to their fractional relationship with the image. For example, a basic search region of P×P pels in QCIF image 30 (FIG. 13) translates to a search region about subband block 137 in $SB_{00}$ of P/2×P/2 (FIG. 8), as indicated at 136, and a search region about subband block 140 in $SB_{01}$ of P/4×P/2 as indicated at 139.

Figure 13:
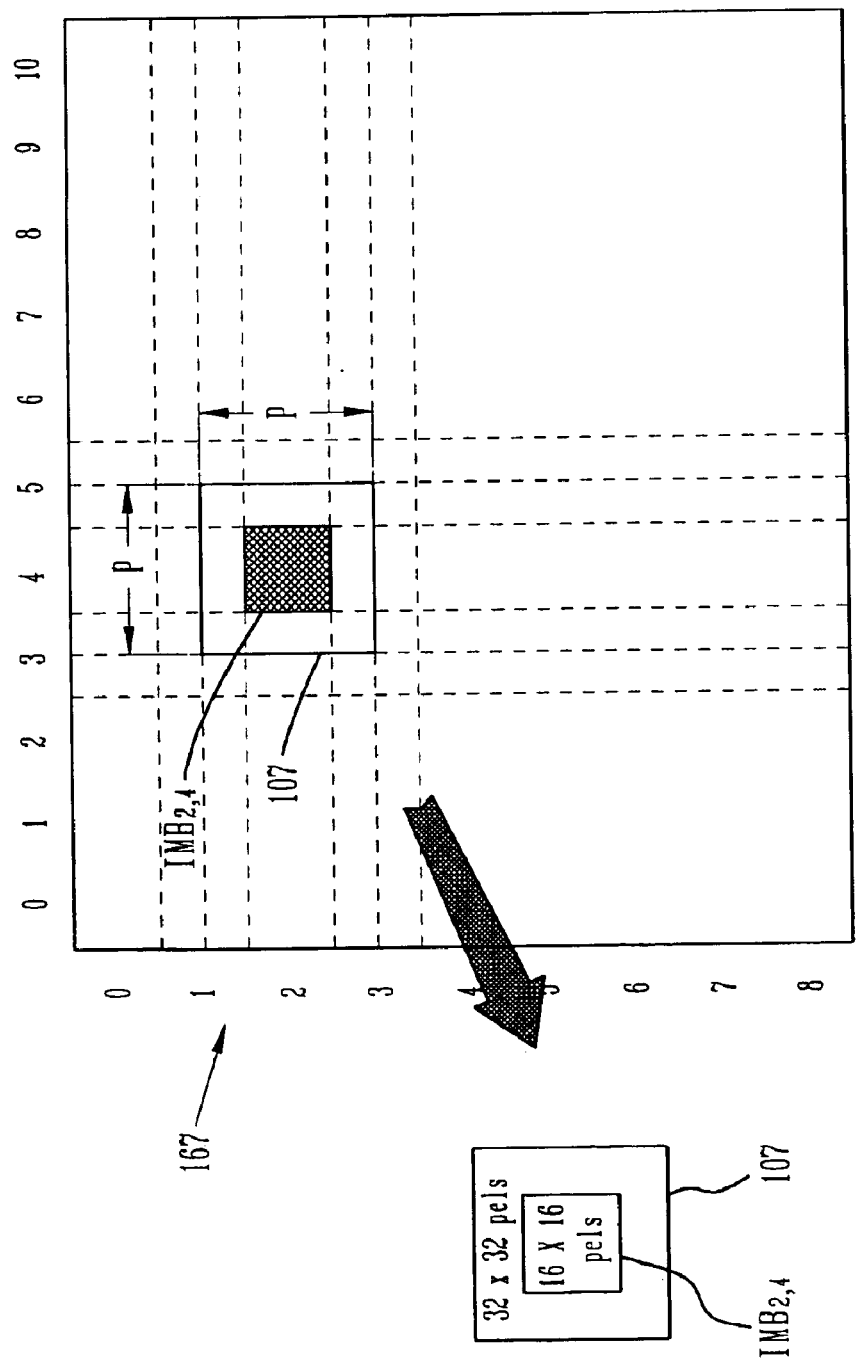
FIG. 13 illustrates a P×P pels search region when searching in the image domain about image macro-block 2,4 ($IMB_{2,4}$) when the input size is QCIF.

For the examples of motion estimation provided herein below, the P×P search region 107 of FIG. 13 is to include 32×32 pels, which is four (4) times the size of $IMB_{2,4}$, having 16×16 pels. Therefore, the P/2×P/2 search region 136 (FIG. 8) includes 16×16 coefficients which is four (4) times the size of subband block 137 (8×8 coefficients). And, the P/4×P/2 search region 139 includes 16×8 coefficients which is four (4) times the size of subband block 140 (8×4 coefficients). As will be further described herein below, the subband search regions are used to facilitate determining motion vectors for each significant subband block (0,0 through 8,10) in some or all of the subbands ($SB_{00}$ through $SB_{33}$).

The basic size (P×P) of the search region can be determined by empirical or statistical analysis taking into consideration, for example, the amount of movement anticipated between frames. In addition, consideration should be given to the computational effort needed to carry out a search in a given search region. It is readily understood by those skilled in the art that larger search regions require more computational resources and, hence, more interframe delay for a fixed processor. Conversely, smaller search regions require less computational resources but sacrifice image quality. This is especially true during high image-movement periods. That is, the quality of the image is reduced since part of the motion may be located out of the search region, thus preventing accurate motion vector selection.

As described above, ranked subband grouping 53 and ranked subband macro-block grouping 54 are fed from block 52 to delay block 62 and motion estimation block 56, respectively, over line 55. For the example herein below, a search region is placed about subband block 2,4 of $SB_{00}$ in delayed ranked subband grouping 57 (FIG. 8). And, a subband block of $SB_{00}$ in subband macro-block 2,4 in ranked subband macro-block grouping 54 (ref. subband block 116 in FIG. 5(c)) is used to traverse the search region for change. However, as noted above, any selection of the subbands or all of the subbands may be used following the below described method.

Referring now to FIGS. 3, 8, and 9, as described above, ranked subband grouping 53 is delayed in delay 62 producing delayed ranked subband grouping 57 (the 'reference' frame). Delayed ranked subband grouping 57 is fed to motion estimation block 56 wherein a search region 136 is identified to as having a P/2×P/2 region in $SB_{00}$ about subband block 137. For this example, the search region is equal to 16×16 coefficients. Ranked subband macro-block grouping 54 (the 'present' frame) is also fed to motion estimation block 56 wherein a subband block 138 (FIG. 9(a)), similar to the shaded area of subband block 116 in FIG. 5(c), is retrieved for use in the comparison process described below.

Referring now in particular to FIGS. 9(a) through (d) there is illustrated the process by which motion vectors ($MV_{x,x}$) are determined in motion estimation block 56 of FIG. 3. In the below example, a motion vector is determined for one subband block, i.e., subband block 2,4, of $SB_{00}$. However, motion vectors can be determined for each significant subband block in each subband ($SB_{00}$ through $SB_{33}$).

Referring to FIG. 9(a), subband block 138 of ranked subband macro-block grouping 54 is located within the search region 136 of delayed ranked subband grouping 57 (FIG. 8). Subband block 138 is essentially superimposed on subband block 137 of delayed ranked subband grouping 57. As discussed above, ranked subband macro-block grouping 54 has a structure similar to subband macro-block grouping 40 illustrated in FIG. 5(c). And, delayed ranked subband grouping 57 has a structure similar to the collection of subbands 34 illustrated in FIG. 4(b). Referring again to FIG. 9(a), coefficients 141 of search region 136 (illustrated as four (4) circles with an 'x' in each) and coefficients 142 of subband block 138 (illustrated as four (4) circles) are used herein to facilitate illustrating the method of determining motion vectors. It is assumed for this example that coefficients 141 and 142 are approximately equal in value and that the remaining coefficients (not shown) are of a different value from coefficients 141 and 142, but approximately equal to each other. The difference in the positions of coefficients 141 and 142 represents a change between two video frames, e.g., translational movement.

Referring to FIG. 9(b), subband block 138 traverses, i.e., searches in a predetermined stepwise pattern, search region 136 seeking to determine the total absolute difference at each step between subband block 138 and search region 136. Those skilled in the art will recognize that various traversing patterns can be used. In addition, criterion other than total absolute difference can be used as a basis for the comparison. The initial comparison seeks to find the best match utilizing incremental, or whole step, movements of subband block 138. An incremental movement is a full shift, or step, in either the x or y direction. For example, in searching the entire search region 136, subband block 138 shifts within search region 136 by ±4 increments, i.e., transform coefficients, in the x direction and ±4 increments in the y direction. Subband block 138 shifts ±4 increments in the x and y direction because subband block 138 has 8×8 coefficients while search region 136 has 16×16 coefficients.

With continued reference to FIG. 9(b), after conducting an incremental search, the best match is found to be three (3) full incremental movements in the positive x direction and two (2) full incremental movements in the positive x direction and two (2) full incremental movements in the positive y direction. Thereafter, as viewed in FIG. 9(c), fractional differences are determined to more accurately represent the difference between subband block 138 and search region 136. To facilitate this process, masks representing fractional movement appropriate for the particular subband are applied to subband block 138.

For example, because $SB_{00}$ is one-quarter (¼) the size of the related macro-block in the original image (see $IMB_{2,4}$ of FIG. 4(a)), there are four fractional movements that subband block 138 can make to more accurately reproduce the finer movements of $IMB_{2,4}$. That is, subband block 138 can move ±½ of an increment in the x direction and ±½ of an increment in the y direction. Therefore, four fractional masks 143 are used to alter subband block 138 in search of the best match.

With continued reference to FIG. 9(c), the four masks 143 are applied to subband block 138. Between the application of each mask the total absolute difference between the coefficients in subband block 138 and search region 136 is determined. If a better match is found, in comparison to that determined during incremental searching described above, the fractional mask is added to the motion vector. In the example, the best match is determined to be +½ fractional movement in the positive x direction. The resulting x and y components of the motion vector are +3½ and +2, respectively. Those skilled in the art will recognize that it is unusual to obtain as exact a match as that illustrated in the above example. In this sense, the 'best match' between the coefficients of the subband block and the coefficients of the search region may more accurately be described as the 'closest approximation' between the two. Motion prediction is used later to compensate for this lack of accuracy.

Referring to FIG. 9(d), the x and y components of the motion vector have their signs inversed and are scaled. More particularly, multiplying each of the x and y components by negative one (−1) and, in this example where $SB_{00}$ is used for motion estimation, multiplying each of the x and y components by two (2). The signs of the x and y components are inversed so that when the motion vectors are applied to delayed ranked subband grouping 57 during motion prediction (discussed in more detail below), the appropriate coefficients are moved from the 'previous' frame position to the 'present' frame position. And, the x and y components are scaled up so to represent the movement determined above (x=3½, y=2) in terms of the related macro-block in the original QCIF image ($IMB_{2,4}$). Scaling allows a more simple determination of the x and y components used in shifting the appropriate coefficients in subbands $SB_{00}$ through $SB_{33}$ during motion prediction.

In the example, the resulting motion vector identifying the movement of the subband blocks in $SMB_{2,4}$ is x=−7 and y=−4 ($MV_{2,4}$). $MV_{2,4}$ is stored in memory with the collection of motion vectors 58. $MV_{2,4}$ therefore represents the movement of certain collections of coefficients from each subband in delayed ranked subband grouping 57 (the 'reference' frame) to their new positions so to predict ranked subband grouping 53 (the 'present' frame). The above process is repeated for each significant subband block in, for example, $SB_{00}$. Processing typically proceeds in the order of ranking, that is, from the macro-blocks having the greatest amount of movement to those having the least amount of movement. Entirely insignificant subband blocks will not be considered at all and therefore will have no motion vector assigned. This will occur, for example, when there is insignificant or no change at those locations between frames. It can also occur when subbands blocks are zero (0) referenced as described herein above.

If a different subband is to be used to calculate the motion vectors, incremental and fractional movements would be determined in a manner analogous to that described above using the proportional relationship of the particular subband with respect to the QCIF image 30. For example, if subband blocks in $SB_{01}$ are used to develop the motion vectors, the following criterion would apply: search region size=16×8 coefficients; x fractional masks=±¼, ±½, and ±¾ increments; y fractional masks=±½ increments; x scaling=4; and y scaling=2.

An advantage of using the above method is that separable filters can be employed. In other words, filters used for incremental and fractional movement of one subband block can be used for incremental and fractional movement of another subband block. For example, subband blocks in $SB_{00}$ have four (4) possible fractional movements of x=±½ and y=±½. And, subband blocks in $SB_{01}$ have eight (8) possible fractional movements of x=±¼, ±½, and ±¾, and y=±½. Because of the common fractional movements of x=±½ and y=±½ in $SB_{00}$ and $SB_{01}$, single separable filters can be used for fractional movements of x=+½, x=−½, y=+½, and y=−½ in both subbands. This method can be used for all common fractional movements in delayed ranked subband grouping 57. The same advantageous use of separable filters can be carried out in motion prediction block 60.

Figure 10:
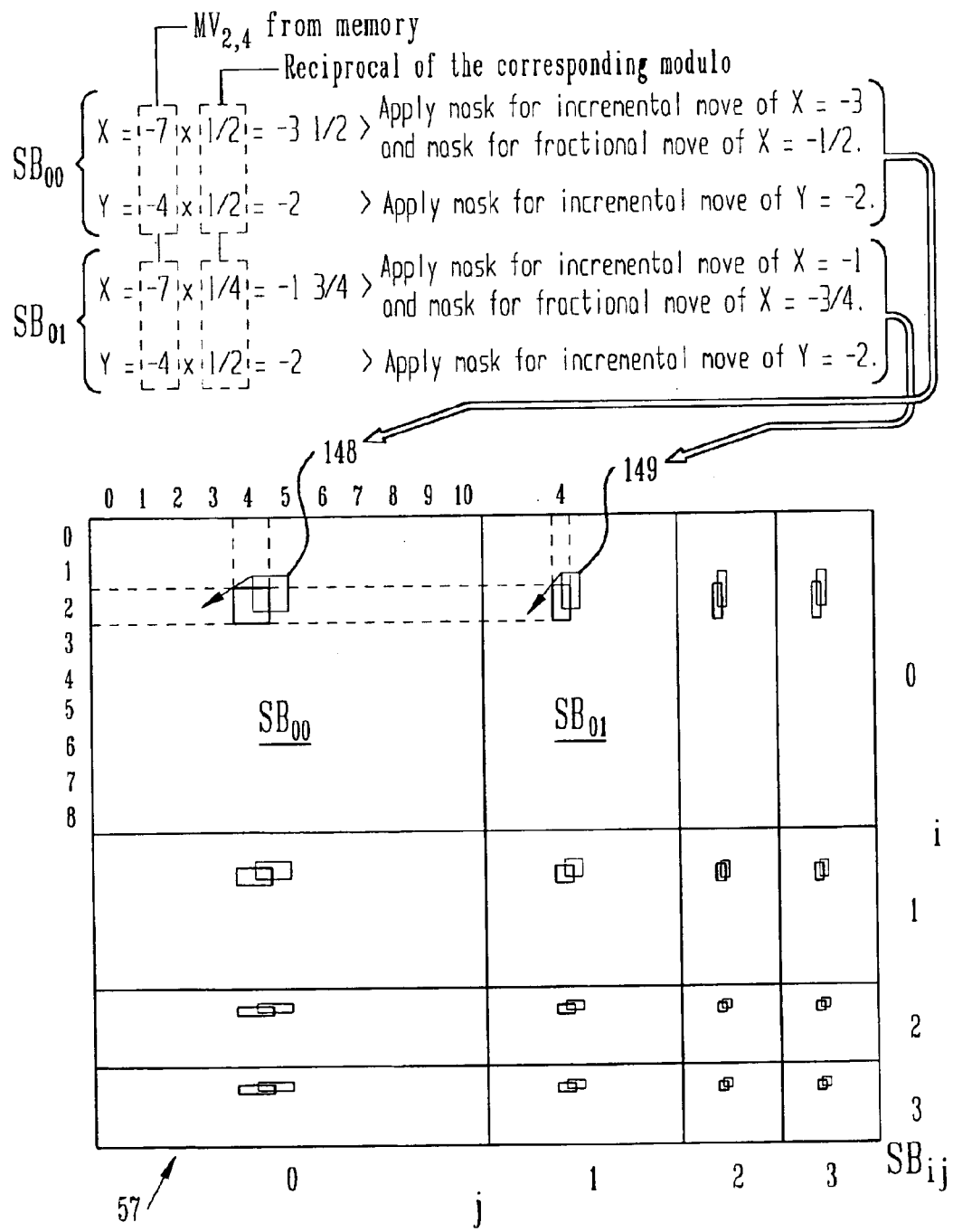
FIG. 10 illustrates a method by which motion is predicted in the transform domain.

Referring to FIG. 10, after all significant subband blocks have been processed in motion estimation block 56, the collection of motion vectors 58 are output to motion prediction block 60 and positional encoding block 76. In motion prediction block 60 the motion vectors are used to calculate the shift of certain collections of coefficients from each subband in delayed ranked subband grouping 57 (the 'reference' frame) to their new positions so to predict ranked subband grouping 53 (the 'present' frame).

To determine which masks to use to produce such shifts, the x and y components are multiplied by the reciprocal of the corresponding modulo of each subband block. For example, to determine the x and y components for shifting the 8×8 collection of coefficients 148 that have been determined to have moved to the 2,4 position in $SB_{00}$, the x and y components of $MV_{2,4}$ are each multiplied by the reciprocal of the corresponding modulo two (2). This calculation results in x=−3½ and y=−2. Therefore, a mask for incremental movement of x=−3, a mask for fractional movement of x=−½, and a mask for incremental movement of y=−2 are applied to the 8×8 coefficients 148.

As a second example, to determine the x and y components for shifting the 8×4 collection of coefficients 149 that have been determined to have moved to the 2,4 position of $SB_{01}$, the x component of $MV_{2,4}$ is multiplied by the reciprocal of modulo four (4) and the y component of $MV_{2,4}$ is multiplied by the reciprocal of modulo two (2). This calculation results in x=−1¾ and y=−2. Therefore, a mask for incremental movement of x=−1, a mask for fractional movement of x=−¾, and a mask for incremental movement of y=−2 are applied.

FIG. 10 illustrates the movement of all the collections of coefficients to the subband blocks corresponding to $SMB_{2,4}$. The application of all motion vectors ($MV_{x,x}$) from the collection of motion vectors 58 to delayed ranked subband grouping 57 (the 'reference' frame) results in a prediction of ranked subband grouping 53 (the 'present' frame) and is called the predicted grouping 66 (FIG. 3).

An alternate embodiment of the above described masking process for determining fractional movement between frames includes the use of 3×3 coefficient masks. These masks take a weighted average of the coefficients surrounding a selected coefficient. In the alternate approach, a collection of motion vectors 58 that include only incremental movements is determined as described above and illustrated in FIGS. 9(*a*) and 9(*b*) for each significant subband block in each subband ($SB_{00}$ through $SB_{33}$) or a select number subbands, e.g., $SB_{00}$ only. The collection of motion vectors 58 are fed to motion prediction block 60.

In motion prediction block 60, the collection of motion vectors 58 is applied in a manner analogous to that illustrated in FIG. 10 causing significant subband blocks of the delayed ranked subband grouping 57 to be incrementally shifted. Thereafter, each coefficient of each shifted collection of coefficients has a 3×3 mask applied to it. The masks that are applied determine the weighted average of the coefficients surrounding each shifted coefficient. The resultant of that calculation is the prediction of the shifted coefficient, i.e., the coefficients new value.

After all of the motion vectors from the collection of motion vectors 58 have been applied to delayed ranked subband grouping 57 and all of the coefficients that were shifted by the motion vectors have had the 3×3 mask applied to them, the result is output from motion prediction block 60 as predicted grouping 66. Of course, the process is repeated in prediction block 98 of decoder 82 to replicate the masking process carried out in motion prediction block 60.

After the prediction is determined by either of the methods described above, predicted grouping 66 is passed to difference block 68 wherein the difference between ranked subband grouping 53 and predicted grouping 66 is determined. As described above, difference block 68 produces grouping differences 70.

Although the motion compensation methods described herein are illustrated as functioning in conjunction with a tensor product wavelet, it is important to note that the methods can be utilized with other types of transforms. This includes utilizing the motion compensation methods with other transforms in either the time domain or the transform domain. For example, data transformed in a DCT can be motion compensated in a manner similar to that described above. That is, the 64 transform coefficients in each of the 8×8 blocks of the DCT can be motion compensated in a manner similar to that used to motion compensate the 64 transform coefficients in each of the 8×8 subband blocks in $SB_{00}$ of the tensor product wavelet transform.

Figure 11:
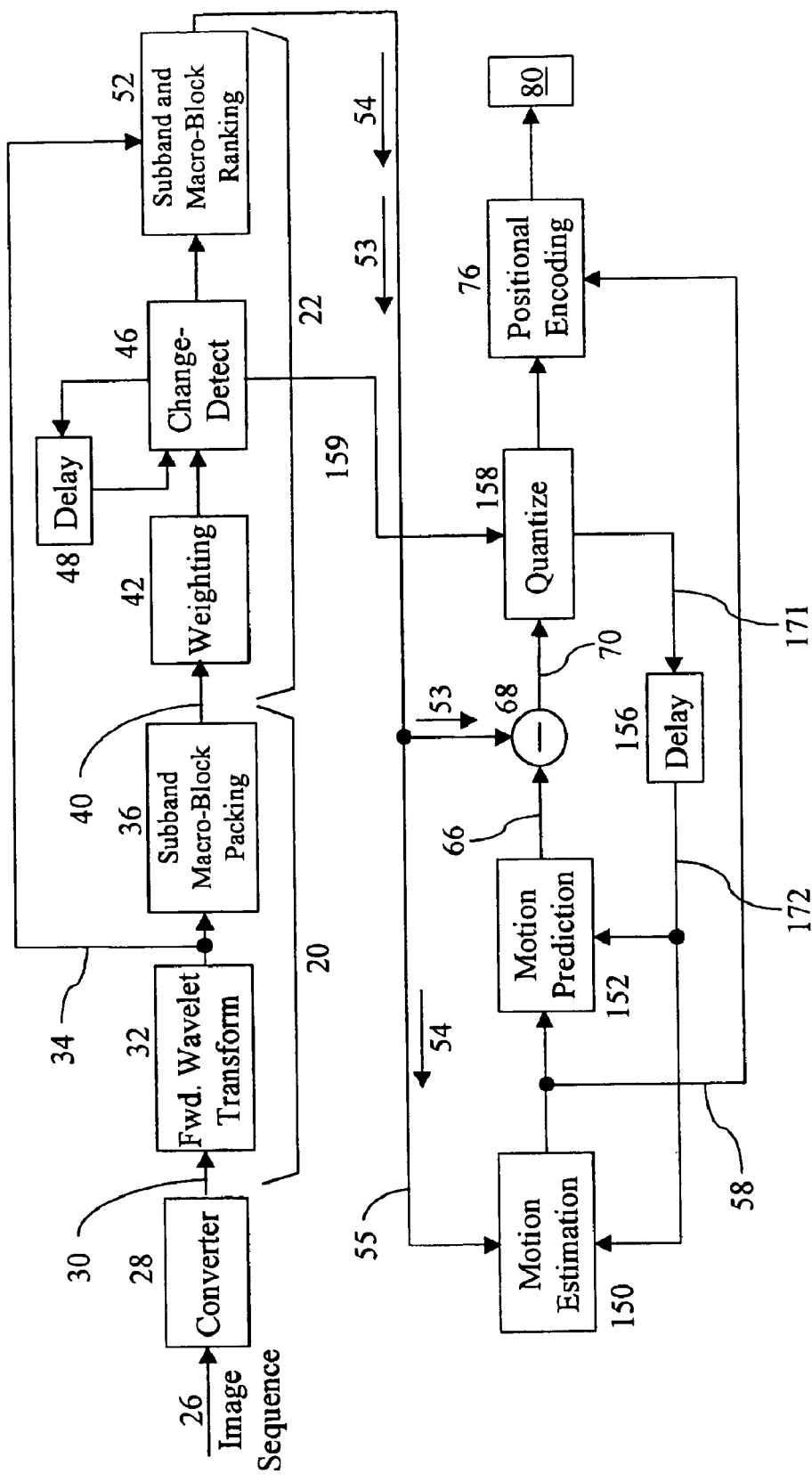
FIG. 11 is a schematic block diagram illustrating another detailed arrangement of the embodiment illustrated in FIG. 2.

Referring now to FIG. 11 there is illustrated another embodiment of the video encoder. As in the embodiment described above and illustrated in FIG. 3, motion estimation and motion prediction are carried out in the transform domain in blocks 150 and 152, respectively. Also, the front portion of the embodiment is similar to that discussed above and illustrated in FIG. 3. More specifically, CIF image 26 is converted to a QCIF image 30 in converter 28. QCIF image 30 is transformed and converted to a subband macro-block grouping 40 by the image to feature mapping components 20. And, the collection of subbands 34 and the subband macro-block grouping 40 are converted to ranked subband grouping 53 and ranked subband macro-block grouping 54, respectively, by the components associated with determining the features which changed 22.

Also similar to the embodiment illustrated in FIG. 3 is that ranked subband macro-block grouping 54 is fed to a motion estimation block 150 and ranked subband grouping 53 is fed to difference block 68. However, instead of utilizing a delayed ranked subband grouping 57 as a reference frame, an error corrected subband grouping 171, having accumulated errors added thereto, is fed to delay block 156, thereby producing delayed subband grouping 172 (the 'reference frame'). Such a variation is necessary when quantization (or scaling) is so great that it substantially alters the prediction errors 70 produced in difference block 68.

To develop error corrected subband grouping 171, a copy of ranked subband grouping 53 is passed unchanged through difference block 68 and stored in memory when the system is referenced to zero (0), for example, when the system is initiated or when the reference in the decoder is to be refreshed. Thereafter, prediction errors 70 are accumulated, i.e., added to the reference, as the prediction errors 70 of each subsequent frame passes quantize block 158. The updated reference image is fed to delay block 156, thereby producing delayed subband grouping 172. By utilizing this method the reference in the encoder remains synchronized with the reference in the decoder. Those skilled in the art will recognize that such an arrangement is useful in maintaining synchronization between the encoder and decoder when significant amounts of scaling and/or quantization is carried out between motion prediction and positional encoding.

After motion estimation block 150 and motion prediction block 152 receive the delayed subband grouping 172 from delay block 156, motion estimation and motion prediction are determined by a procedure similar to that described herein above and illustrated in FIGS. 8 through 10. In addition, a forward feed 159 is provided between change detect 46 and quantize block 158 for adjusting the amount of quantization that is to be performed on a particular block, depending on the amount the block has changed. When a large amount of change is detected in change detect 46, a large number of bits are allocated for quantization. And conversely, when a small amount of change is detected in change detect 46, a proportionately lesser number of bits are allocated for quantization.

Figure 12:
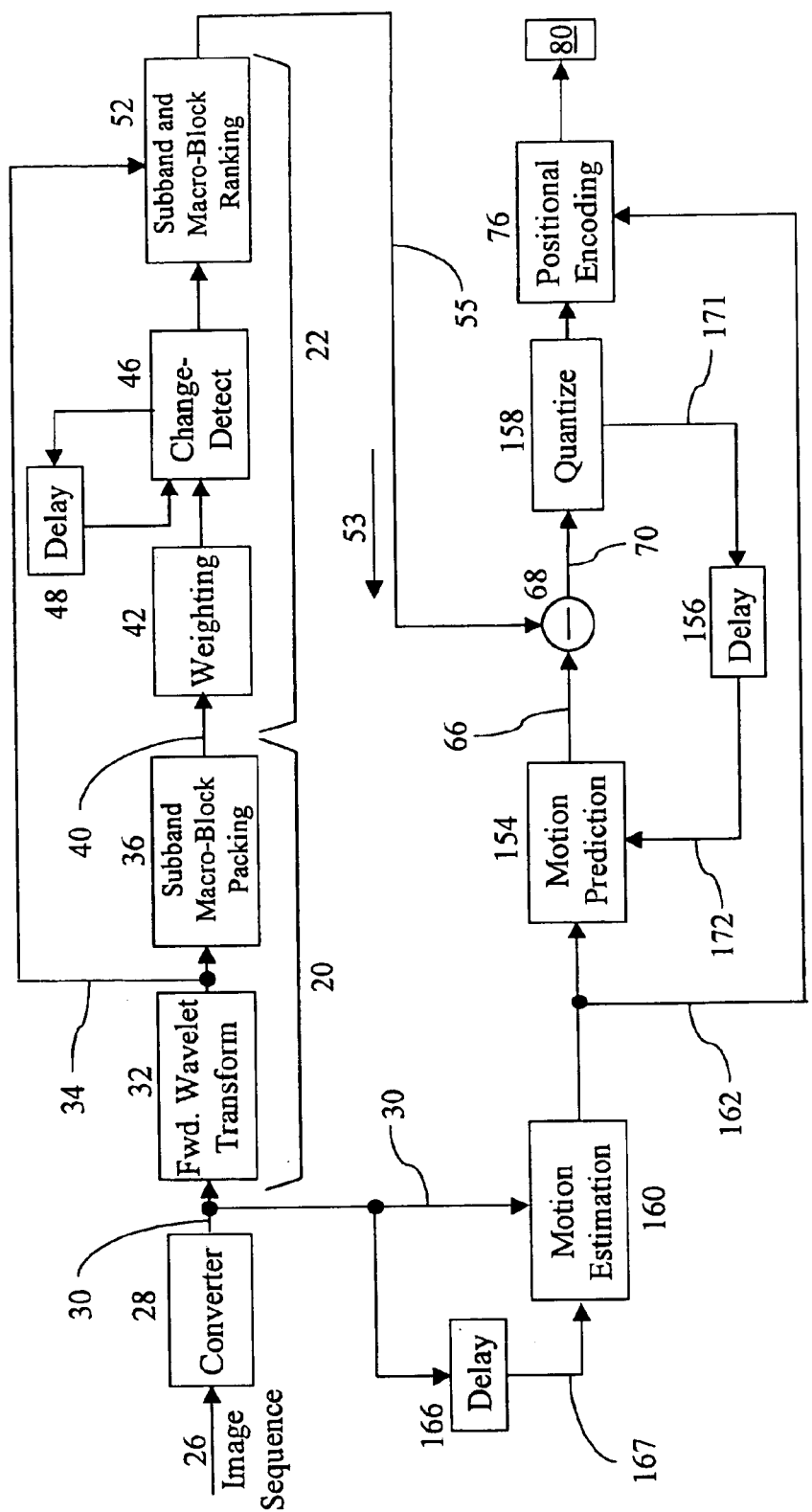
FIG. 12 is a schematic block diagram illustrating another detailed embodiment of the invention wherein motion estimation is carried out in the image domain and motion prediction is carried out in the transform domain.

Referring now to FIG. 12 there is illustrated yet another embodiment of the video encoder. The front portion of this embodiment is similar to the embodiments discussed above and illustrated in FIGS. 3 and 11. However, unlike the embodiments described above, motion estimation is carried out in the image domain. This embodiment takes advantage of special hardware configurations presently available on some processors.

In FIG. 12, a CIF image 26 is converted to a QCIF image 30 in converter block 28. The QCIF image 30 is transformed and converted to a subband macro-block grouping 40 by the image to feature mapping components 20. Subband macro-block grouping 40 are processed by the components associated with determining the features which have changed 22 to determine subband macro-block ranking. The results are applied to the collection of subbands 34 resulting in ranked subband grouping 53. Ranked subband grouping 53 is thereafter fed to difference block 68.

The QCIF image 30, also referred to as the 'present' frame, is also fed to motion estimation block 160 and delay block 166 for determining a collection of motion vectors 162. More specifically, an image frame 30 is delayed in delay 166 producing a delayed image frame 167, also referred to as the 'reference' frame. With reference to FIG. 13, delayed image frame 167 is fed to motion estimation block 160 wherein a P×P pels search region is developed about each significant image macro-block. For example, a P×P pels search region 107 is established about image macro-block 2,4 ($IMB_{2,4}$). Based on empirical analysis, a search region 107 of 32×32 pels is used as the search region about a 16×16 pels image macro-block of a QCIF image frame.

In motion estimation block 160, each significant image macro-block ($IMB_{X,X}$) of the present QCIF image 30 frame is located within the corresponding search region in the delayed image frame 167 for determining the motion vectors. For example, $IMB_{2,4}$ is retrieved from QCIF image 30 and located within search region 107 of delayed image frame 167. This process is analogous to that carried out in the transform domain as described above and illustrated in FIGS. 8 and 9($a$).

In a manner analogous to that described above and illustrated in FIG. 9($b$), $IMB_{2,4}$ traverses search region 107 seeking to determine the minimum total absolute difference at each step between $IMB_{2,4}$ and search region 107. Unlike subband searching described above, however, fractional searching is unnecessary when searching in the image domain. Therefore, after determining the incremental movement of $IMB_{2,4}$, the x and y coordinates are inversed (multiplied by −1) and stored in memory with the collection of motion vectors 162. The motion vectors are fed to motion prediction block 154 and positional encoding block 76. Thereafter, the motion vectors are applied to delayed subband grouping 172 in a manner similar to that described above with regard to FIGS. 3 and 11 and illustrated in FIG. 10.

Figure 14:
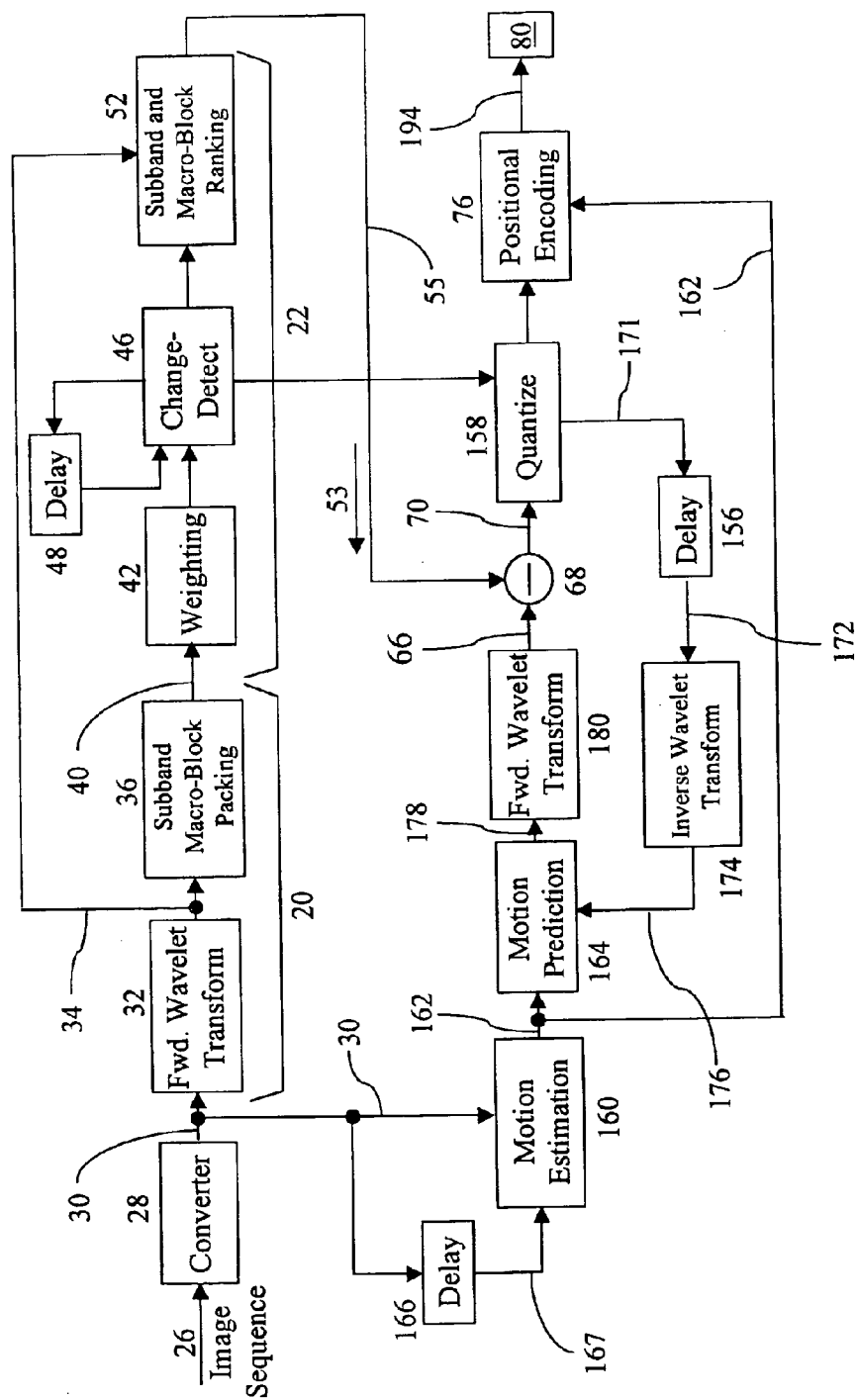
FIG. 14 is a schematic block diagram illustrating another detailed embodiment of the invention wherein motion estimation and motion prediction is carried out in the image domain.

Referring now to FIG. 14, another embodiment of the video encoder is illustrated wherein the front portion is similar to the embodiments discussed above and illustrated in FIGS. 3, 11 and 12. However, unlike the embodiments described above, both motion estimation and motion prediction are carried out in the image domain.

In FIG. 14, a collection of motion vectors 162 are determined in a manner similar to that described above and illustrated in FIGS. 12 and 13. The collection of motion vectors 162 are fed to block 164 for motion prediction and to block 76 for positional encoding. In a manner similar to that described above and illustrated in FIGS. 11 and 12, an error corrected subband grouping 171, having accumulated errors added thereto, is fed to delay block 156, thereby producing delayed subband grouping 172 (the 'reference frame'). Unlike the above described embodiments, however, the delayed subband grouping 172 is then reconstructed by inverse wavelet transform block 174 to form a reconstructed image 176. The reconstructed image has a structure that is similar to QCIF image 30 illustrated in FIG. 4(a).

Alternatively, instead of reconstructing the delayed subband grouping 172 in its entirety, a portion of the grouping can be reconstructed to effectuate efficiencies. For example, a 3, 5 filter can be used to obtain a reconstructed region having 48×48 pels. Regions are selected based on the significance of, i.e., the detected changes within, the image macro-blocks (16×16) about which the regions are centered.

In motion prediction block 164, the collection of motion vectors 162 are applied to the reconstructed image 176 (or the reconstructed 48×48 pels regions if only regions were inverse wavelet transformed). The collection of motion vectors 162 are applied to the reconstructed reference image 176 in a manner analogous to that described above and illustrated in FIG. 10 for the shifting collections of transform coefficients in the subband representation of the QCIF image. Thereafter, a prediction 178 is fed to forward wavelet transform block 180 producing predicted grouping 66. The predicted grouping 66 is then subtracted from ranked subband grouping 53 in difference block 68 resulting in grouping differences 70. Quantization is carried out in block 158 and the errors are accumulated to maintain the reference (as described above) and are also forwarded to positional encoding block 76. Positional encoding of the quantized errors and motion vectors 162 takes place as described above and are forwarded to the decoder via transmission line 80.

Although illustrated herein as a software implementation, the principles of the embodiments of the invention could also be implemented in hardware, for example, by means of an application-specific integrated circuit (ASIC). Preferably, the ASIC implementation, including the necessary memory requirements, should operate at the pel rate in order to (i) minimize power consumption consistent with the embodiment, and (ii) permit compression of full color video, such as for example a full CCIR601, at a data rate of less than 13.5 MHz. It is foreseen that power consumption will be reduced by a factor of ten (10) times by utilizing an ASIC in comparison to the conventional software and processor implementation.

Alternatively, optical methods can be employed to produce even further power savings. As described above, an approximation to the image is created at each stage of the wavelet transform and the details lost by making this approximation are recorded. In a photo-electronic or an optical implementation, how the light is gathered and related charge is sensed can be adjusted to gather samples of each of the approximation images. If these approximation images are co-registered in parallel, the detail terms can be calculated from these intermediate values by either analog or digital means. Preferably, analog means are used to calculate the detail terms as the output of an analog stage.

The detail terms can be quantized through the use of a bit serial analog-to-digital converter which implements the quantization strategy. The resulting bit stream is compressed. In this manner, the photonic/optical device operates, i.e., the number of digital transitions which occur, at the compressed data rate rather than at the image data rate (as in the case of an ASIC) or the processor data rate (as in the case of a conventional processor). This will result in an implementation which consumes very little current, thus requiring less power. It is foreseen that the implementation of an optical method will further reduce power consumption by a factor of approximately ten (10) times that of an ASIC implementation.

It is to be understood that the embodiments and variations shown and described herein are merely illustrative of the principles of this invention and that various modifications may be implemented by those skilled in the art without departing from the scope and spirit of the invention.

What is claimed is:

1. A method of compressing data including first and second data sets comprising:
    transforming the first and second data sets into corresponding first and second transform coefficient sets,
    generating data representing differences between the first and second transform coefficient sets; and
    encoding the generated data for transmission,
    wherein said generating includes the steps of:
        estimating the differences between the first and second transform coefficient sets to provide motion vectors;
        applying the motion vectors to the first transform coefficient set to produce a prediction of the second transform coefficient set; and
        subtracting the prediction from the second transform coefficient set resulting in a set of prediction errors.

2. The method of compressing data as recited in claim 1, wherein transforming the first and second data sets is performed utilizing a tensor product wavelet transform.

3. The method of compressing data as recited in claim 2, wherein remainders from one subband are transmitted to another subband.

4. The method of compressing data as recited in claim 1, wherein the first and second transform coefficient sets are error corrected.

5. The method of compressing data as recited in claim 1, wherein applying the motion vectors to the first transform coefficient set further includes applying a mask about each effected transform coefficient to obtain a weighted average of neighboring transform coefficients.

6. The method of compressing data as recited in claim 1, wherein estimating differences between the first and second transform coefficient sets includes:
    generating a search region about a subset of transform coefficients from one of the first and the second transform coefficient sets;
    applying a related subset of transform coefficients from the other of the first and the second transform coefficient sets to the search region; and
    traversing incrementally the related subset of transform coefficients within the search region to a position representing a best incremental match.

7. The method of compressing data as recited in claim 6, further including traversing fractionally the related subset of transform coefficients within the search region to a position representing a best fractional match.

8. The method of compressing data as recited in claim 1, wherein transforming of the first and second date sets produces the first transform coefficient set as a first collection of subbands and the second transform coefficients set as a second collection of subbands.

9. The method of compressing data as recited in claim 1, wherein transforming of the first and second date sets produces the first transform coefficient set as a first collection of subbands and the second transform coefficient set as a second collection of subbands, and further including macro-block packing the second collection of subbands to form a subband macro-block grouping.

10. The method of compressing data as recited in claim 9, further including applying weighting to subband macro-blocks within the subband macro-block grouping.

11. The method of compressing data as recited in claim 9, further including detecting changes between the subband macro-block grouping and a reference.

12. The method of compressing data as recited in claim 11, wherein detecting changes between the subband macroblock grouping and the reference is based on a distortion evaluation according to a general equation of the form:

$$e_c = \sum_i W_i \|G - R\|_x^{P_x}.$$

13. The method of compressing data as recited in claim 12, wherein detecting changes between the subband macroblock grouping and the reference is based on a distortion evaluation according to an equation of a more specific form:

$$e_c = W_0\|G-R\|_2^2 + W_1\|G-R\|_\infty^2.$$

14. The method of compressing data as recited in claim 9, wherein generating data representing differences between the first and second transform coefficient sets includes:
   estimating the differences between the first collection of subbands and the subband macro-block grouping to provide motion vectors;
   applying the motion vectors to the first collection of subbands to produce a prediction of the second collection of subbands; and
   subtracting the prediction from the second collection of subbands resulting in a set of prediction errors.

15. The method of compressing data as recited in claim 14, wherein estimating the differences between the first collection of subbands and the subband macro-block grouping includes:
   generating a search region about a subset of transform coefficients from the first collection of subbands;
   applying a related subset of transform coefficients from the subband macro-block grouping to the search region; and
   traversing incrementally the related subset of transform coefficients within the search region to a position representing a best incremental match.

16. The method of compressing data as recited in claim 15, further including traversing fractionally the related subset of transform coefficient within the search region to a position representing a best fractional match.

17. The method of compressing data as recited in claim 1, wherein encoding the generated data for transmission further includes identifying subsets of the generated data that are equal to zero.

18. A method of compressing data including first and second data sets comprising:
   transforming the first data set and the second data set into corresponding first and second transform coefficient sets;
   estimating differences between the first and second transform coefficient sets to provide motion vectors;
   predicting the second transform coefficient set by applying the motion vectors to the first transform coefficient set;
   subtracting the predicted second transform coefficient set from the second transform coefficient set to obtain prediction errors; and
   encoding the prediction errors and the motion vectors for transfer to a decoder.

19. The method of compressing data as recited in claim 18, wherein transforming the first data set and the second data set is carried out utilizing a tensor product wavelet transform.

20. The method of compressing data as recited in claim 18, wherein estimating differences between the first and second transform coefficient sets includes:
   generating a search region about a subset of transform coefficients from one of the first and the second transform coefficient sets;
   applying a related subset of transform coefficients from the other of the first and the second transform coefficient sets to the search region; and
   traversing incrementally the related subset of transform coefficients within the search region to a portion representing a best incremental match.

21. The method of compressing data as recited in claim 20, further including traversing fractionally the related subset of transform coefficients within the search region to a position representing a best fractional match.

22. The method of compressing data as recited in claim 18, wherein transforming of the first data set and the second data set produces the first transform coefficient set as a first collection of subbands and the second transform coefficient set as a second collection of subbands.

23. The method of compressing data as recited in claim 22, further including macro-block packing the second collection of subbands to form a subband macro-block grouping.

24. The method of compressing data as recited in claim 23, further including applying weighting to subband macroblocks which make up the subband macro-block grouping.

25. The method of compressing data as recited in claim 23, further including detecting changes between the subband macro-block grouping and a reference.

26. The method of compressing data as recited in claim 25, wherein detecting changes between the subband macroblock grouping and a reference is based on a distortion evaluation according to a general equation of the form:

$$e_c = W_0\|G-R\|_2^2 + W_1\|G-R\|_\infty^2.$$

27. The method of compressing data as recited in claim 18, wherein encoding the prediction errors and the motion vectors for transfer to the decoder further includes identifying subsets of the prediction errors that are equal to zero.

28. A method of compressing data including first and second data sets comprising:
   transforming the first data set and the second data set into corresponding first and second transform coefficient sets;
   estimating differences between the first and second data sets to provide motion vectors;
   predicting the second transform coefficient set by applying the motion vectors to the first transform coefficient set; and
   subtracting the predicted second transform coefficient set from the second transform coefficient set to obtain prediction errors.

29. The method of compressing data as recited in claim 28, wherein the first transform coefficient set is error corrected.

30. A method of compressing data is an encoder to reduce the number of bits transferred to a decoder comprising:
   transforming a first data set and a subsequent second data set producing corresponding first and second transform coefficient sets;
   estimating differences between the first and second data sets to provide motion vectors;
   predicting the second transform coefficient set by applying the motion vectors to the first data set and thereafter transforming the prediction results; and
   subtracting the transformed prediction results from the second transform coefficient set to obtain prediction errors.

31. The method of compressing data as recited in claim 30, further including inverse transforming the first transform coefficient set and providing the first transform coefficient set as a reference during predicting.

32. The method of compressing data as recited in claim 31, wherein the first transform coefficient set is error corrected.

33. A method for transforming a data set into transform coefficients comprising transforming the data set utilizing a tensor product wavelet transform having at least two filter paths and propagating remainders derived during transforming between at least two of the filter paths,
wherein the tensor product wavelet transform is a tensor product wavelet pair for determining a high pass component and a low pass component, and
wherein transforming of each data set and propagating their remainders between the filter paths includes:
determining the low pass component and the high pass component of the data set;
normalizing the low pass component to generate a low pass normalized output and a first remainder (rl).

34. The method as recited in claim 33, wherein the remainder from a first filter path of the at least two filter paths are propagated to a second filter path of the at least two filter paths and the remainders from the second filter path are propagated to the first filter path.

35. The method as recited in claim 33, wherein the tensor product wavelet transform is a tensor product wavelet pair for determining a high pass component and a low pass component.

36. The method as recited in claim 33,
wherein transforming of each data set and propagating their remainders between the filter paths further includes:
normalizing the high pass component to generate a high pass normalized output and a second remainder (rh);
performing a first operation (g(rl,rh)) on the first and second remainders (rl,rh) and adding the results emanating therefrom to the low pass normalized output to generate an approximation; and
performing a second operation (f(rl,rh)) on the first and second remainders (rl, rh) and adding the results emanating therefrom to the high pass normalized output to generate a detail.

37. The method as recited in claim 36, further including downsampling the low pass component and the high pass component.

38. The method as recited in claim 36, wherein the low pass component is determined utilizing a filter having the value −1, 2, 6, 2, −1; the high pass component is determined utilizing a filter having the value −1, 2, −1; and further including a first operation (g(rl,rh)) and a second operation (f(rl,rh)) having functions as follows:
g(rl,rh)=rh; and
f(rl,rh)=floor(rh+½), where nh=½.

39. The method as recited in claim 36, wherein the tensor product wavelet pair is of the form:

$$D_i = X_{2i} - \left\lfloor \frac{X_{2i-1} + X_{2i+1}}{2} \right\rfloor; \text{ and}$$

$$A_i = X_{2i+1} + \left\lfloor \frac{D_i + D_{i+1} + 2}{4} \right\rfloor.$$

40. An encoder apparatus comprising:
a transformation device, having an input configured to receive a first and second set of data, and further configured to generate a corresponding first and second collection of subbands;
a motion compensation device, having an input coupled to the transformation device, configured to receive the first and second collection of subbands, and further configured to efficiently represent differences between the first and second collection of subbands; and
a difference block that is configured to receive a prediction from the motion compensation device and the second collection of subbands from the transformation device, and further configured to determine the difference between the prediction and the second collection of subbands for generating a prediction error.

41. The encoder apparatus as recited in claim 39, wherein the motion compensation device carries out all operations on the first and second collection of subbands in the transform domain.

42. The encoder apparatus as recited in claim 40, wherein the motion compensation device includes:
a motion estimation device, coupled to the transformation device, configured to compare the first and second collection of subbands to generate motion vectors; and
a motion prediction device, coupled to the motion estimation device and the transformation device, configured to receive the motion vectors and the first collection of subbands, and further configured to generate a prediction of the second collection of subbands.

43. An encoder apparatus for detecting changes comprising:
a transformation device, having an input configured to receive a first data set and a second data set, and further configured to respectively generate therefrom a first collection of subbands and a second collection of subbands; and
a macro-block packing device having an input coupled to the transformation device and configured to receive the first collection of subbands and the second collection of subbands and further configured to respectively generate a first subband macro-block representation and a second subband macro-block representation.

44. The encoder apparatus as recited in claim 43, further including a weighting device having an input configured to communicate with the macro-block packing device and configured to receive and then scale the first subband macro-block representation and the second subband macro-block representation based on perceptual importance.

45. The encoder apparatus as recited in claim 43, further including a change-detect device, having an input configured to communicate with the macro-block packing device and configured to compare the first subband macro-block representation and the second subband macro-block representation to determine the changes therebetween, the change-detect device further configured to generate a change-detected grouping which reflects the changes.

46. The encoder apparatus as recited in claim 45, further including a macro-block ranking device having an input coupled to the change-detect device and configured to rank the change-detected grouping.

47. The encoder apparatus as recited in claim 45, wherein the comparison of the first subband macro-block representation and the second subband macro-block representation is based on a distortion evaluation according to the general equation:

$$e_c = \sum_i W_i \|G - R\|_x^{P_x}.$$

48. The encoder apparatus as recited in claim 47, wherein the comparison of the first subband macro-block representation and the second subband macro-block representation is based on a distortion evaluation according to an equation of a more specific form $$e_c = \sum_i W_i \|G - R\|_x^{P_x}.$$

* * * * *